(12) United States Patent
Fukuda et al.

(10) Patent No.: US 11,846,087 B2
(45) Date of Patent: Dec. 19, 2023

(54) WORKING MACHINE

(71) Applicant: KUBOTA CORPORATION, Osaka (JP)

(72) Inventors: Yuji Fukuda, Osaka (JP); Kohei Nagao, Osaka (JP); Ryota Hamamoto, Osaka (JP); Hiroaki Nakagawa, Osaka (JP); Jun Tomita, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 377 days.

(21) Appl. No.: 17/388,719

(22) Filed: Jul. 29, 2021

(65) Prior Publication Data

US 2022/0049460 A1 Feb. 17, 2022

(30) Foreign Application Priority Data

| Aug. 15, 2020 | (JP) | ................................ 2020-137167 |
| Aug. 15, 2020 | (JP) | ................................ 2020-137171 |
| Aug. 15, 2020 | (JP) | ................................ 2020-137172 |
| Jun. 2, 2021 | (JP) | ................................... 2021-93044 |

(51) Int. Cl.
*E02F 9/22* (2006.01)
*B62D 11/06* (2006.01)
*F15B 18/00* (2006.01)
*B62D 11/00* (2006.01)

(52) U.S. Cl.
CPC ............ *E02F 9/225* (2013.01); *B62D 11/005* (2013.01); *B62D 11/06* (2013.01); *E02F 9/2235* (2013.01); *E02F 9/2275* (2013.01); *E02F 9/2292* (2013.01); *F15B 18/00* (2013.01); *E02F 9/2285* (2013.01); *E02F 9/2296* (2013.01); *F15B 2211/57* (2013.01)

(58) Field of Classification Search
CPC ....... E02F 9/225; E02F 9/2235; E02F 9/2275; E02F 9/2292; E02F 9/2285; E02F 9/2296; B62D 11/06; B62D 11/005; F15B 18/00; F15B 2211/57
See application file for complete search history.

(56) References Cited

U.S. PATENT DOCUMENTS

2013/0332036 A1* 12/2013 Yamamoto ............ E02F 9/2296
701/50

FOREIGN PATENT DOCUMENTS

JP 2017-179923 A 10/2017

* cited by examiner

*Primary Examiner* — Jacob M Amick
(74) *Attorney, Agent, or Firm* — GREENBLUM & BERNSTEIN, P.L.C.

(57) ABSTRACT

A working machine includes a controller configured to determine a first deceleration threshold corresponding to each of a first traveling pressure, a second traveling pressure, a third traveling pressure, and a fourth traveling pressure, to perform automatic deceleration to reduce rotation speeds of a left traveling motor and a right traveling motor, and to judge whether to perform the automatic deceleration based on the determined first deceleration threshold, the first traveling pressure, the second traveling pressure, the third traveling pressure, and the fourth traveling pressure.

19 Claims, 13 Drawing Sheets

Fig.3A

First threshold information

| Prime mover | First deceleration threshold ST1 (rpm) | | | |
|---|---|---|---|---|
| Rotation speed | LF(t,rpm) | LB(t,rpm) | RF(t,rpm) | RB(t,rpm) |
| 1000rpm | 24.0 | 25.0 | 23.0 | 23.1 |
| 1250rpm | 25.0 | 26.0 | 24.0 | 24.4 |
| 1500rpm | 26.0 | 27.0 | 25.0 | 25.7 |
| 1750rpm | 27.0 | 28.0 | 26.0 | 27.0 |
| 2000rpm | 28.0 | 29.0 | 27.0 | 28.3 |
| 2250rpm | 29.0 | 30.0 | 28.0 | 29.6 |
| 2500rpm | 30.0 | 31.0 | 29.0 | 30.9 |

Fig.3B

Second threshold information

| Prime mover Rotation speed | Second deceleration threshold ST2(rpm) | | | |
|---|---|---|---|---|
| | b(t,rpm) | d(t,rpm) | a(t,rpm) | c(t,rpm) |
| 1000rpm | 22.0 | 23.0 | 21.0 | 21.1 |
| 1250rpm | 23.0 | 24.0 | 22.0 | 22.4 |
| 1500rpm | 24.0 | 25.0 | 23.0 | 23.7 |
| 1750rpm | 25.0 | 26.0 | 24.0 | 25.0 |
| 2000rpm | 26.0 | 27.0 | 25.0 | 26.3 |
| 2250rpm | 27.0 | 28.0 | 26.0 | 27.6 |
| 2500rpm | 28.0 | 29.0 | 27.0 | 28.9 |

Fig.4A

Third threshold information

| Prime mover | First restoration threshold SK1(rpm) | | | |
|---|---|---|---|---|
| Rotation speed | LF(t,rpm) | LB(t,rpm) | RF(t,rpm) | RB(t,rpm) |
| 1000rpm | 14.0 | 15.0 | 13.0 | 13.1 |
| 1250rpm | 15.0 | 16.0 | 14.0 | 14.4 |
| 1500rpm | 16.0 | 17.0 | 15.0 | 15.7 |
| 1750rpm | 17.0 | 18.0 | 16.0 | 17.0 |
| 2000rpm | 18.0 | 19.0 | 17.0 | 18.3 |
| 2250rpm | 19.0 | 20.0 | 18.0 | 19.6 |
| 2500rpm | 20.0 | 21.0 | 19.0 | 20.9 |

Fig.4B

Fourth threshold information

| Prime mover Rotation speed | Second restoration threshold SK2(rpm) | | | |
|---|---|---|---|---|
| | b(t,rpm) | d(t,rpm) | a(t,rpm) | c(t,rpm) |
| 1000rpm | 12.0 | 13.0 | 11.0 | 11.1 |
| 1250rpm | 13.0 | 14.0 | 12.0 | 12.4 |
| 1500rpm | 14.0 | 15.0 | 13.0 | 13.7 |
| 1750rpm | 15.0 | 16.0 | 14.0 | 15.0 |
| 2000rpm | 16.0 | 17.0 | 15.0 | 16.3 |
| 2250rpm | 17.0 | 18.0 | 16.0 | 17.6 |
| 2500rpm | 18.0 | 19.0 | 17.0 | 18.9 |

Fig.5

| Prime mover rotation speed (rpm) | First traveling relief pressure (rpm)/ Second traveling relief pressure (rpm)/ Third traveling relief pressure (rpm)/ Fourth traveling relief pressure (rpm) |
|---|---|
| 2400rpm | W1(2400rpm)、W2(2400rpm)、W3(2400rpm)、W4(2400rpm) |
| 2300rpm | W1(2300rpm)、W2(2300rpm)、W3(2300rpm)、W4(2300rpm) |
| 2200rpm | W1(2200rpm)、W2(2200rpm)、W3(2200rpm)、W4(2200rpm) |
| ... | ... |
| 1000rpm | W1(1000rpm)、W2(1000rpm)、W3(1000rpm)、W4(1000rpm) |
| 900rpm | W1(900rpm)、W2(900rpm)、W3(900rpm)、W4(900rpm) |
| 800rpm | W1(800rpm)、W2(800rpm)、W3(800rpm)、W4(800rpm) |
| 700rpm | W1(700rpm)、W2(700rpm)、W3(700rpm)、W4(700rpm) |
| ... | ... |

WORKING MACHINE

CROSS-REFERENCE TO RELATED APPLICATIONS

This application claims the benefit of priority to Japanese Patent Application No. 2020-137167 filed on Aug. 15, 2020, to Japanese Patent Application No. 2020-137172 filed on Aug. 15, 2020, to Japanese Patent Application No. 2020-137171 filed on Aug. 15, 2020, and to Japanese Patent Application No. 2021-093044 filed on Jun. 2, 2021. The entire contents of this application are hereby incorporated herein by reference.

BACKGROUND OF THE INVENTION

1. Field of the Invention

The present invention relates to a working machine such as a skid steer loader, a compact track loader, and a backhoe.

2. Description of the Related Art

Japanese unexamined patent application publication No. 2017-179923 discloses a technique for decelerating and accelerating a working machine. The working machine described in Japanese unexamined patent application publication No. 2017-179923 has a prime mover including an engine, a hydraulic pump configured to be driven by power of the prime mover and to output an operation fluid, a traveling hydraulic device configured to switch a speed between a first speed and a second speed that is faster than the first speed according to a pressure of the operation fluid, an operation valve configured to change the pressure of the operation fluid applied to the traveling hydraulic device, and a measurement device configured to detect the pressure of the operation fluid. When a detected pressure, which is a pressure of the operation fluid detected by the measurement device, drops from a set pressure corresponding to the second speed to a predetermined pressure or lower, the operation valve reduces the pressure of the operation fluid applied to the traveling hydraulic device to decelerate the traveling hydraulic device to the first speed.

SUMMARY OF THE INVENTION

In one aspect of the present invention, a working machine comprises a machine body, a left traveling device provided on a left portion of the machine body, a right traveling device provided on a right portion of the machine body, a left traveling motor configured to output a power transmitted to the left traveling device, a right traveling motor configured to output a power transmitted to the right traveling device, a left traveling pump to deliver operation fluid supplied to the left traveling motor, a part of the operation fluid being used to control the operation fluid delivery of the left traveling pump, a right traveling pump to deliver operation fluid supplied to the right traveling motor, a part of the operation fluid being used to control the operation fluid delivery of the right traveling pump, a first circulation fluid line connecting the left traveling pump to the left traveling motor, the left traveling motor having a first port and a second port to receive and discharge the operation fluid from and to the left traveling pump via the first circulation fluid line, a second circulation fluid line connecting the right traveling pump to the right traveling motor, the right traveling motor having a third port and a fourth port to receive and discharge the operation fluid from and to the right traveling pump via the second circulation fluid line, a first pressure detector to detect a first traveling pressure that is a pressure of the operation fluid flowing in a portion of the first circulation fluid line interposed between the left traveling pump and the first port of the left traveling motor when the left traveling motor rotates, a second pressure detector to detect a second traveling pressure that is a pressure of the operation fluid flowing in a portion of the first circulation fluid line interposed between the left traveling pump and the second port of the left traveling motor when the left traveling motor rotates, a third pressure detector to detect a third traveling pressure that is a pressure of the operation fluid flowing in a portion of the second circulation fluid line interposed between the right traveling pump and the third port of the right traveling motor when the right traveling motor rotates, a fourth pressure detector to detect a fourth traveling pressure that is a pressure of the operation fluid flowing in another portion of the second circulation fluid line interposed between the right traveling pump and the fourth port of the right traveling motor when the right traveling motor rotates, and a controller configured or programmed to determine a first deceleration threshold corresponding to each of the first, second, third and fourth traveling pressures, to perform automatic deceleration to reduce rotation speeds of the left and right traveling motors, and to judge whether to perform the automatic deceleration based on the determined first deceleration threshold and the first, second, third and fourth traveling pressures.

The controller is configured or programmed to determine the first deceleration threshold corresponding to each rotation speed of a prime mover, and corresponding to each of the first, second, third and fourth traveling pressures.

The controller is configured or programmed to determine the first deceleration threshold corresponding to one rotation speed of the prime mover, and varying to correspond to each of the first, second, third and fourth traveling pressures.

The controller is configured or programmed to refer to the first, second, third and fourth traveling pressures during rotation of the prime mover at a predetermined rotation speed, and to perform the automatic deceleration when any one of the referred-to first, second, third and fourth traveling pressures is equal to or higher than the first deceleration threshold.

The controller is configured or programmed to determine a first restoration threshold corresponding to each of the first, second, third and fourth traveling pressures, to perform speed-restoration to restore the rotation speeds of the left and right traveling motors before performing the automatic deceleration, and to judge whether to perform the speed-restoration based on the determined first restoration threshold and the first, second, third and fourth traveling pressures.

The controller is configured or programmed to determine a first restoration threshold corresponding to each rotation speed of a prime mover for driving the left and right traveling pumps, and corresponding to each of the first, second, third and fourth traveling pressures.

The controller is configured or programmed to determine the first restoration threshold corresponding to one rotation speed of the prime mover, and varying to correspond to each of the first, second, third and fourth traveling pressures.

The controller is configured or programmed to refer to the first, second, third and fourth traveling pressures during rotation of the prime mover at a predetermined rotation speed, and to perform the speed-restoration when any one of the referred-to first, second, third and fourth traveling pressures is equal to or less than the first restoration threshold.

Alternatively, the working machine comprises a controller configured or programmed to determine a second deceleration threshold corresponding to each of a first differential pressure acquired by subtracting the second traveling pressure from the first traveling pressure, a second differential pressure acquired by subtracting the first traveling pressure from the second traveling pressure, a third differential pressure acquired by subtracting the fourth traveling pressure from the third traveling pressure, and a fourth differential pressure acquired by subtracting the third traveling pressure from the fourth traveling pressure, to perform automatic deceleration to reduce rotation speeds of the left and right traveling motors, and to judge whether to perform the automatic deceleration based on the determined second deceleration threshold and the first, second, third and fourth differential pressures.

The controller is configured or programmed to determine the second deceleration threshold corresponding to each rotation speed of a prime mover, and corresponding to each of the first, second, third and fourth differential pressures.

The controller is configured to determine the second deceleration threshold corresponding to one rotation speed of the prime mover, and varying to correspond to each of the first, second, third and fourth differential pressures.

The controller is configured or programmed to calculate the first, second, third and fourth differential pressures during rotation of the prime mover at a predetermined rotation speed, and to perform the automatic deceleration when any one of the calculated first, second, third and fourth differential pressures is equal to or higher than the second deceleration threshold.

The controller is configured or programmed to determine a second restoration threshold corresponding to each of the first, second, third and fourth differential pressures, to perform speed-restoration to restore the rotation speeds of the left and right traveling motors before performing to perform speed-restoration to restore the rotation speeds of the left and right traveling motors before performing the automatic deceleration, and to judge whether to perform the speed-restoration based on the determined second restoration threshold and the first, second, third and fourth differential pressures.

The controller is configured or programmed to determine a second restoration threshold corresponding to each rotation speed of a prime mover for driving the left and right traveling pumps, and corresponding to each of the first, second, third and fourth differential pressures.

The controller is configured or programmed to determine the second restoration threshold corresponding to one rotation speed of the prime mover, and differing to correspond to each of the first, second, third and fourth differential pressures.

The controller is configured or programmed to calculate the first, second, third and fourth differential pressures during rotation of the prime mover at a predetermined rotation speed, and to perform the speed-restoration when any one of the calculated first, second, third and fourth differential pressures is equal to or less than the second restoration threshold.

In another aspect of the present invention, a working machine comprises a machine body, a prime mover provided on the machine body, a left traveling device provided on a left portion of the machine body, a right traveling device provided on a right portion of the machine body, a left traveling motor configured to output a power transmitted to the left traveling device and to have a rotation speed set at a speed stage shiftable between a first speed stage and a second speed stage higher than the first speed stage, a right traveling motor configured to output a power transmitted to the right traveling device and to have a rotation speed set at a speed stage shiftable between a first speed stage and a second speed stage higher than the first speed stage, a left traveling pump having a first port to deliver operation fluid for normal rotation of the left traveling motor and a second port to deliver operation fluid for reverse rotation of the left traveling motor, a right traveling pump having a third port to deliver operation fluid for normal rotation of the right traveling motor and a fourth port to deliver operation fluid for reverse rotation of the right traveling motor, a first circulation fluid line including a passage extended from the first port of the left traveling pump and another passage extended from the second port of the left traveling pump and connecting the passages extended from the first and second ports of the left traveling pump to the left traveling motor, a second circulation fluid line including a passage extended from the third port of the right traveling pump and another passage extended from the fourth port of the right traveling pump and connecting the passages extended from the third and fourth ports of the right traveling pump to the right traveling motor, a first relief valve connected to the passage of the first circulation fluid line extended from the first port, a second relief valve connected to the passage of the first circulation fluid line extended from the second port, a third relief valve connected to the passage of the second circulation fluid line extended from the third port, a fourth relief valve connected to the passage of the second circulation fluid line extended from the fourth port, a traveling operation device operably connected to a traveling operation member and configured to use a part of the operation fluid to apply a pressure for control the operation fluid delivery of any one of the left traveling pump and the right traveling pump according to operation of the traveling operation member, a traveling fluid line connecting the traveling operation device to the left traveling pump and right traveling pump to supply the part of the operation fluid, and a controller configured or programmed to perform automatic deceleration to automatically reduce the rotation speeds of the left and right traveling motors each set at the second speed stage by shifting the speed stage of each of the left and right traveling motors from the second speed stage to the first speed stage. The controller is configured or programmed to determine a deceleration threshold based on a first traveling relief pressure of the first relief valve, a second traveling relief pressure of the second relief valve, a third traveling relief pressure of the third relief valve, and a fourth traveling relief pressure of the fourth relief valve, and to judge whether to perform the automatic deceleration by using the deceleration threshold.

The working machine comprises a setting switch configured to switch an operation mode between an acquisition mode for acquiring the first traveling relief pressure, the second traveling relief pressure, the third traveling relief pressure, and the fourth traveling relief pressure and a traveling mode for allowing the automatic deceleration. The controller is configured or programmed so that, when the operation mode is set in the acquisition mode, a rotation speed of the prime mover is set to a predetermined rotation speed, and the first traveling relief pressure, the second traveling relief pressure, the third traveling relief pressure, and the fourth traveling relief pressure are acquired during rotation of the prime mover at the predetermined rotation speed, and so that, when the operation mode is set in the traveling mode, the deceleration threshold is determined based on the first traveling relief pressure, the second traveling relief pressure, the third traveling relief pressure, and the fourth traveling relief pressure which have been acquired in the acquisition mode.

The controller is configured or programmed to determine the deceleration threshold based on the first traveling relief pressure, the second traveling relief pressure, the third traveling relief pressure, the fourth traveling relief pressure, and a correction coefficient.

The controller is configured or programmed to change the correction coefficient according to variation in a rotation speed of the prime mover.

The controller is configured or programmed to increase the correction coefficient according to increase of the rotation speed of the prime mover, and to reduce the correction coefficient according to reduction of the rotation speed of the prime mover.

The controller reduces the correction coefficient according to increase of a rotation speed of the prime mover, and increases the correction coefficient according to reduction of the rotation speed of the prime mover.

The working machine comprises a first pressure detector provided on a passage of the first circulation fluid line connecting the left traveling pump to a first port of the left traveling motor and configured to detect a first traveling pressure that is a pressure of the operation fluid flowing in the passage of the first circulation fluid line connected to the first port of the left traveling motor when the left traveling motor rotates, a second pressure detector provided on another passage of the first circulation fluid line connecting the left traveling pump to a second port of the left traveling motor and configured to detect a second traveling pressure that is a pressure of the operation fluid flowing in the passage of the first circulation fluid line connected to the second port of the left traveling motor when the left traveling motor rotates, a third pressure detector provided on a passage of the second circulation fluid line connecting the right traveling pump to a third port of the right traveling motor and configured to detect a third traveling pressure that is a pressure of the operation fluid flowing in the passage of the second circulation fluid line connected to the third port of the right traveling motor when the right traveling motor rotates, a fourth pressure detector provided on another passage of the second circulation fluid line connecting the right traveling pump to a fourth port of the right traveling motor and configured to detect a fourth traveling pressure that is a pressure of operation fluid flowing in the passage of the second circulation fluid line connected to the fourth port of the right traveling motor when the right traveling motor rotates. When the left and right traveling motors are each set in the second speed stage, the controller is configured or programmed to judge whether to perform the automatic deceleration based on any one of the first traveling pressure, the second traveling pressure, the third traveling pressure, and the fourth traveling pressure and on the determined deceleration threshold.

In another aspect of the present invention, a working machine includes a machine body, a prime mover provided on the machine body, a left traveling device provided on a left portion of the machine body, a right traveling device provided on a right portion of the machine body, a left traveling motor configured to output a power transmitted to the left traveling device and to have a rotation speed set at a speed stage between a first speed stage and a second speed stage higher than the first speed stage, a right traveling motor configured to output a power transmitted to the right traveling device and to have a rotation speed set at a speed stage shiftable between a first speed stage and a second speed stage higher than the first speed stage, a left traveling pump having a first port to deliver operation fluid for normal rotation of the left traveling motor and a second port to deliver operation fluid for reverse rotation of the left traveling motor, a right traveling pump having a third port to deliver operation fluid for normal rotation of the right traveling motor and a fourth port to deliver operation fluid for reverse rotation of the right traveling motor, a first circulation fluid line including a passage extended from the first port of the left traveling pump and another passage extended from the second port of the left traveling pump, and connecting the passages extended from the first and second ports of the left traveling pump to the left traveling motor, a second circulation fluid line including a passage extended from the third port of the right traveling pump and another passage extended from the fourth port of the right traveling pump, and connecting the passages from the third and fourth ports of the right traveling pump to the right traveling motor, a first relief valve connected to the passage of the first circulation fluid line extended from the first port, a second relief valve connected to the passage of the first circulation fluid line extended from the second port, a third relief valve connected to the passage of the second circulation fluid line extended from the third port, a fourth relief valve connected to the passage of the second circulation fluid line extended from the fourth port, and a controller configured or programmed to perform a control, and to judge whether to perform the control based on any one of a first effective relief pressure corresponding to the first relief valve, a second effective relief pressure corresponding to the second relief valve, a third effective relief pressure corresponding to the third relief valve, and a fourth effective relief pressure corresponding to the fourth relief valve.

The controller is configured or programmed to determine a deceleration threshold based on at least one of the first effective relief pressure, the second effective relief pressure, the third effective relief pressure, and the fourth effective relief pressure during rotation of the left and right traveling motors each set at the second speed stage, to perform an automatic deceleration control to automatically reduce the rotation speeds of the left and right traveling motors by shifting the speed stage of each of the left and right traveling motors from the second speed stage to the first speed stage, and to judge whether to perform the automatic deceleration control by using the determined deceleration threshold.

The controller is configured or programmed to determine a turn judgment value based on at least one of the first effective relief pressure, the second effective relief pressure, the third effective relief pressure, and the fourth effective relief pressure, and to judge whether the machine body is turning or not by using the determined turn judgment value.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3A is a view showing a relationship among a rotation speed of a prime mover, a first traveling pressure LF (t, rpm), a second traveling pressure LB (t, rpm), a third traveling pressure RF (t, rpm), a fourth traveling pressure RB (t, rpm), and a first deceleration threshold according to the first embodiment.

FIG. 3B is a view showing a relationship among the rotation speed of the prime mover, a first differential pressure b (t, rpm), a second differential pressure d (t, rpm), a third differential pressure a (t, rpm), a fourth differential pressure c (t, rpm), and a second deceleration threshold according to the first embodiment.

FIG. 4A is a view showing a relationship among the rotation speed of the prime mover, the first traveling pressure LF (t, rpm), the second traveling pressure LB (t, rpm), the third traveling pressure RF (t, rpm), the fourth traveling pressure RB (t, rpm), and the first deceleration threshold according to the first embodiment.

FIG. 4B is a view showing a relationship among the rotation speed of the prime mover, the first differential pressure b (t, rpm), the second differential pressure d (t, rpm), the third differential pressure a (t, rpm), the fourth differential pressure c (t, rpm), and the second deceleration threshold according to the first embodiment.

FIG. 5 is a view showing an example of a first traveling relief pressure w1 (rpm), a second traveling relief pressure w2 (rpm), a third traveling relief pressure w3 (rpm), and a fourth traveling relief pressure w4 (rpm) corresponding the a prime mover rotation speed.

DETAILED DESCRIPTION OF THE PREFERRED EMBODIMENTS

Figure 1:
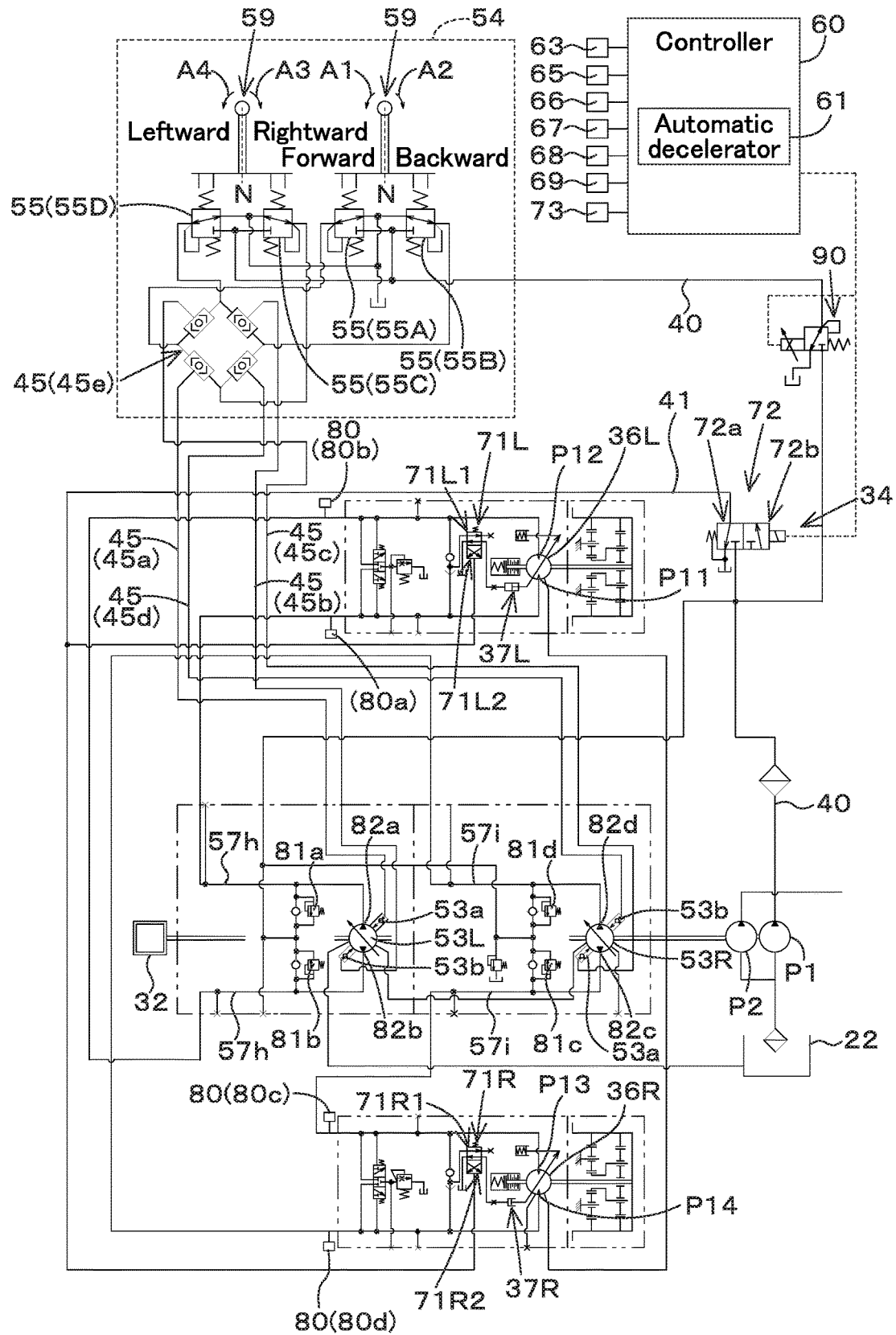
FIG. 1 is a view showing a hydraulic system (a hydraulic circuit) for a working machine according to a first embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings, some preferred embodiments regarding a hydraulic system for a working machine and a working machine having the hydraulic system will be described below.

First Embodiment

Figure 11:
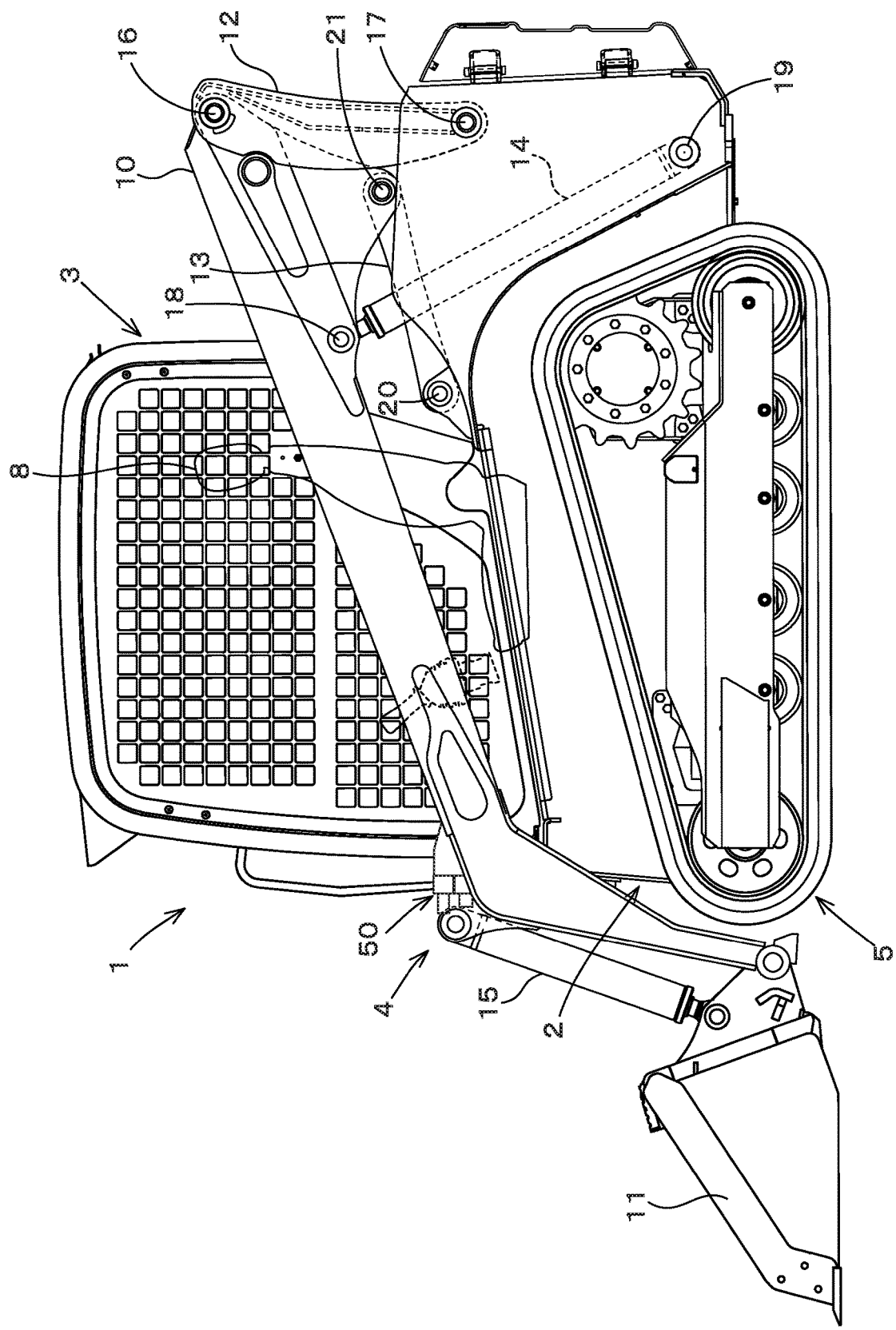
FIG. 11 is a side view showing a track loader that is an example of the working machine.

FIG. 11, shows a side view of the working machine according to an embodiment of the present invention. In FIG. 11, a compact track loader is shown as an example of the working machine. However, the working machine is not limited to a compact track loader, but may be another typed loader, such as a skid steer loader, for example. In addition, the working machine may be other than the loader.

As shown in FIG. 11, the working machine 1 includes a machine body 2, a cabin 3, a working device 4, and a pair of traveling devices 5L and 5R. In the embodiments of the present invention, a forward direction of a driver siting on a driver seat 8 of the working machine 1 (a left side in FIG. 11) is referred to as the front, a rearward direction of the driver (a right side in FIG. 11) is referred to as the rear, a leftward direction of the driver (a front surface side of FIG. 11) is referred to as the left, and a rightward direction of the driver (a back surface side of FIG. 11) is referred to as the right. A horizontal direction, which is orthogonal to a fore-and-aft direction, is referred to as a machine width direction. A direction from the center of the machine body 2 to the right or left is referred to as a machine outward direction. In other words, the machine outward direction is the machine width direction away from the machine body 2. A direction opposite to the machine outward direction is referred to as a machine inward direction. In other words, the machine inward direction is the machine width direction approaching the machine body 2.

The cabin 3 is mounted on the machine body 2. The cabin 3 accommodates the driver seat 8. The working device 4 is attached to the machine body 2. A pair of traveling devices 5L and 5R are provided on outer sides the machine body 2. A prime mover 32 is mounted on a rear portion inside the machine body 2.

The working device 4 has booms 10, a working tool 11, lift links 12, control links 13, boom cylinders 14, and bucket cylinders 15.

The booms 10 are arranged on right and left sides of the cabin 3 to be swingable up and down. The working tool 11 is, for example, a bucket. The bucket 11 is arranged at tip portions (that is, front end portions) of the booms 10 to be movable up and down. The lift links 12 and the control links 13 support base portions (that is, rear portions) of the booms 10 so as to allow the booms 10 to swing up and down. The boom cylinders 14 are extended and contracted to lift and lower the booms 10. The bucket cylinders 15 are extended and contracted to swing the bucket 11 up and down.

Front portions of the right and left booms 10 are connected to each other by a deformed connecting pipe. Base portions (that is, rear portions) of the booms 10 are connected to each other by a circular connecting pipe.

The right and left lift links 12, the right and left control links 13, and the right and left boom cylinder 14 are arranged on right and left side portions of the machine body 2, corresponding to the right and left booms 10.

The lift links 12 are extended vertically from rear portions of the base portions of the booms 10. Upper portions (that is, one ends) of the lift links 12 are pivotally joined to rear portions of the base portions of the booms 10 via respective pivot shafts (referred to as first pivot shafts) 16 rotatably around lateral axes defined by the first pivot shafts 16 relative to the booms 10. Lower portions (that is, the other ends) of the lift links 12 are pivotally joined to the rear portion of the machine body 2 via respective pivot shafts (referred to as second pivot shafts) 17 rotatably around lateral axes defined by the second pivot shafts 17 relative to the machine body 2. The second pivot shafts 17 are provided below the first pivot shafts 16.

Upper portions of the boom cylinders 14 are pivotally joined to front portions of the base portions of the booms 10 via the respective pivot shafts (referred to as third pivot shafts) 18 rotatably around lateral axes defined by the third pivot shafts 18 relative to the booms 10. Lower portions of the boom cylinders 14 are pivotally joined to a lower rear portion of the machine body 2 via respective pivot shafts (referred to as fourth pivot shafts) 19 rotatably around lateral axes defined by the fourth pivot shafts 19 relative to the machine body 2. The fourth pivot shafts 19 are provided at the lower rear portion of the machine body 2 and below the third pivot shafts 18.

The control links 13 are provided in front of the lift links 12. One ends of the control links 13 are pivoted on respective pivot shafts (referred to as fifth pivot shafts) 20 rotatably around lateral axes defined by the fifth pivot shafts 20. The fifth pivot shafts 20 are provided in the machine body 2 and forward of the lift links 12. The other ends of the control links 13 are pivoted on respective pivot shafts (referred to as sixth pivot shafts) 21 around lateral axes defined by the sixth pivot shafts 21. The sixth pivot shafts 21 are provided through the booms 10 and forwardly upward from the second pivot shafts 17.

By extending and contracting the boom cylinders 14, the booms 10 are swung up and down around the first pivot shafts 16 on which the base portions of the booms 10 are pivotally supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, the alternative working tool is an attachment (that is, an auxiliary attachment) such as a hydraulic crusher, a hydraulic breaker, an angle broom, an earth auger, a pallet fork, a sweeper, a mower, a snow blower, or the like.

A connector member 50 is provided at the front portion of the left boom 10. The connector member 50 is a device configured to connect a hydraulic equipment attached to the auxiliary attachment to a first piping member such as a pipe provided on the left boom 10. Specifically, the first piping member can be connected to one end of the connector member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are arranged respectively near the front portions of the booms 10. The bucket cylinders 15 are extended and contracted to swing the bucket 11.

The traveling device 5L is provided on a left portion of the machine body 2, and the traveling device 5R is provided on a right portion of the machine body 2. In the embodiment, crawler type (including semi-crawler type) traveling devices are adopted for the pair of traveling devices 5L and 5R. Alternatively, wheel-type traveling devices having front wheels and rear wheels may be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, gasoline engine, an electric motor, or the like. In the embodiment, the prime mover 32 is the diesel engine, but is not limited thereto.

Next, the hydraulic system for the working machine will be described.

As shown in FIG. 1, the hydraulic system for the working machine has a first hydraulic pump P1 and a second hydraulic pump P2. The first hydraulic pump P1 is a pump configured to be driven by power of the prime mover 32 and is constituted of a constant displacement gear pump. The first hydraulic pump P1 is capable of delivering operation fluid stored in a tank 22. Specifically, the first hydraulic pump P1 delivers operation fluid that is mainly used for control. For convenience of explanation, the tank 22 that stores operation fluid may be referred to as an operation fluid tank. Of the operation fluid delivered from the first hydraulic pump P1, the operation fluid used for control is referred to as pilot fluid, and a pressure of the pilot fluid is referred to as a pilot pressure.

The second hydraulic pump P2 is a pump configured to be driven by power of the prime mover 32, and is constituted of a constant displacement gear pump. The second hydraulic pump P2 is capable of delivering operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The hydraulic system for the working machine has a pair of traveling motors 36L and 36R and a pair of traveling pumps 53L and 53R. The pair of traveling motors 36L and 36R transmit power to the pair of traveling devices 5L and 5R. The traveling motor 36L transmits rotational power to the traveling device (referred to as a left traveling device) 5L, and the traveling motor 36R transmits rotational power to the traveling device (referred to as a right traveling device) 5R.

The pair of traveling pumps 53L and 53R are pumps to be driven by power of the prime mover 32 and are, for example, swash plate type variable displacement axial pumps. The pair of traveling pumps 53L and 53R are driven to supply operation fluid respectively to the pair of traveling motors 36L and 36R. The traveling pump 53L supplies the operation fluid to the traveling motor 36L, and the traveling pump 53R supplies the operation fluid to the traveling motor 36R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure-receiving portion 53a and a pressure-receiving portion 53b to each of which a pressure (that is, a pilot pressure) of a part of the operation fluid (that is, pilot fluid) from the first hydraulic pump P1 is applied, so that angles of the swash plates are changed by the pilot pressures applied to the pressure-receiving portions 53a and 53b. By changing the angles of the swash plates, outputs (that is, operation fluid delivery rates) and operation fluid delivery directions of the left traveling pump 53L and the right traveling pump 53R can be changed. The left traveling pump 53L has a first port 82a from which operation fluid is delivered for normal rotation of the left traveling motor 36L, and a second port 82b from which operation fluid is delivered for reverse rotation of the left traveling motor 36L. The right traveling pump 53R has a third port 82c from which operation fluid is for normal rotation of the right traveling motor 36R, and a fourth port 82d from which operation fluid is delivered for reverse rotation of the right traveling motor 36R.

The first port 82a and the second port 82b of the left traveling pump 53L are connected to the left traveling motor 36L by the connecting fluid line (referred to as a first circulation fluid line) 57h, so that the operation fluid delivered from the left traveling pump 53L is supplied to the left traveling motor 36L. The third port 82c and the fourth port 82d of the right traveling pump 53R are connected to the right traveling motor 36R by the connecting fluid line (referred to as a second circulation fluid line) 57i, so that the operation fluid delivered from the right traveling pump 53R is supplied to the right traveling motor 36R. The left traveling motor 36L has a first port P11 and a second port P12 to receive and discharge the operation fluid from and to the left traveling pump 53L via the connecting fluid line 57h. The right traveling motor 36R has a third port P13 and a fourth port P14 to receive and discharge the operation fluid from and to the right traveling pump 53R via the connecting fluid line 57i.

A first relief valve 81a is fluidly connected to a passage of the connecting fluid line 57h interposed between the first port 82a of the left traveling pump 53L and the first port P11 of the left traveling motor 36L, and a second relief valve 81b is fluidly connected to another passage of the connecting fluid line 57h interposed between the second port 82b of the left traveling pump 53L and the second port P12 of the left traveling motor 36L. For example, the first relief valve 81a is likely to act (i.e., release a surplus pressure) when a pressure of the operation fluid flowing in the passage of the connecting fluid line 57h interposed between the first port 82a of the left traveling pump 53L and the first port P11 of the left traveling motor 36L is increased during the forward rotation of the left traveling motor 36L, and the second relief valve 81b is likely to act (i.e., release a surplus pressure) when a pressure of the operation fluid flowing in the passage of the connecting fluid line 57h interposed between the second port of 82b the left traveling pump 53L and the second port P12 of the left traveling motor 36L is increased during the reverse rotation of the left traveling motor 36L.

A third relief valve 81c is fluidly connected to a passage of the connecting fluid line 57i interposed between the third port 82c of the right traveling pump 53R and the third port P13 of the right traveling motor 36R, and a fourth relief valve 81d is fluidly connected to another passage of the connecting fluid line 57i interposed between the fourth port 82d of the right traveling pump 53R and the fourth port P14 of the right traveling motor 36R. For example, the third relief valve 81c is likely to act (i.e., release a surplus pressure) when a pressure of the operation fluid flowing in the passage of the connecting fluid line 57i interposed between the third port 82c of the right traveling pump 53R and the third port P14 of the right traveling motor 36R is increased during the forward rotation of the right traveling motor 36R, and the fourth relief valve 81d is likely to act (i.e., release a surplus pressure) when a pressure of the operation fluid flowing in another passage of the connecting fluid line 57i interposed between the fourth port 82d of the right traveling pump 53R and the fourth port P14 of the right traveling motor 36R is increased during the reverse rotation of the right traveling motor 36R.

The left traveling motor 36L can be rotated by operation fluid delivered from the left traveling pump 53L, so that a rotation speed (that is, number of rotations) of the left traveling motor 36L can be changed according to variation in a flow rate of the operation fluid. A swash plate switching cylinder 37L is operably connected to the left traveling motor 36L, so that a rotation speed (that is, number of rotations) of the left traveling motor 36L can also be changed by extending or contracting the swash plate switching cylinder 37L in either one of opposite directions. For example, when the swash plate switching cylinder 37L is contracted, a rotation speed of the left traveling motor 36L is set to a low speed stage (referred to as a first speed stage), and when the swash plate switching cylinder 37L is extended, a rotation speed of the left traveling motor 36L is set to a high speed stage (referred to as a second speed stage). In other words, the rotation speed stage of the left traveling motor 36L is shiftable between the first speed stage that is the low speed stage and the second speed stage that is the high speed stage.

The right traveling motor 36R can be rotated by operation fluid delivered from the right traveling pump 53R, so that a rotation speed (that is, number of rotations) of the right traveling motor 36R can be changed according to variation in a flow rate of the operation fluid. A swash plate switching cylinder 37R is operably connected to the right traveling motor 36R, so that a rotation speed (that is, number of rotations) of the right traveling motor 36R can also be changed by extending or contracting the swash plate switching cylinder 37R in either one of opposite directions. For example, when the swash plate switching cylinder 37R is contracted, a rotation speed of the right traveling motor 36R is set to a low speed stage (referred to as a first speed stage), and when the swash plate switching cylinder 37R is extended, a rotation speed of the right traveling motor 36R is set to a high speed stage (referred to as a second speed stage). In other words, the rotation speed stage of the right traveling motor 36L is shiftable between the first speed stage that is the low speed stage and the second speed stage that is the high speed stage.

As shown in FIG. 1, the hydraulic system for the working device has a traveling switching valve 34. The traveling switching valve 34 is configured to change rotation speeds (that is, numbers of rotations) of the traveling motors (that is, the left traveling motor 36L and the right traveling motor 36R) by shifting the rotation speed stage of each of the left and right traveling motors 36L and 36R between the first speed stage and the second speed stage. A state of the traveling switching valve 34 setting the rotation speed stage of each of the left and right traveling motors 36L and 36R to the first speed stage is referred to as a first state of the traveling switching valve 34, and a state of the traveling switching valve 34 setting the rotation speed stage of each of the left and right traveling motors 36L and 36R to the second speed stage is referred to as a second state of the traveling switching valve 34. The travel switching valve 34 includes first switching valves 71L and 71R and a second switching valve 72.

The first switching valve 71L is connected via a fluid line to the swash plate switching cylinder 37L of the left traveling motor 36L, and includes a two-position switching valve shiftable between a first position 71L1 and a second position 71L2. The first switching valve 71L set at the first position 71L1 contracts the swash plate switching cylinder 37L, and the first switching valve 72L set at the second position 71L2 extends the swash plate switching cylinder 37L.

The first switching valve 71R is connected via a fluid line to the swash plate switching cylinder 37R of the right traveling motor 36R, and includes a two-position switching valve shiftable between a first position 71R1 and a second position 71R2. The first switching valve 71R set at the first position 71R1 contracts the swash plate switching cylinder 37R, and the first switching valve 71R set at the second position 71R2 extends the swash plate switching cylinder 37R.

The second switching valve 72 is a solenoid valve for shifting the first switching valve 71L and the first switching valve 71R, and is configured as a two-position switching valve shiftable between a first position 72a and a second position 72b. The second switching valve 72 is connected to the first switching valve 71L and the first switching valve 71R by a fluid line 41. The second switching valve 72 set at the first position 72a switches the first switching valve 71L and the first switching valve 71R to the first positions 71L1 and 71R1, and the second switching valve 72 set at the second position 72b switches the first switching valve 71L and the first switching valve 71R to the second positions 71L2 and 71R2.

The traveling switching valve 34 is set in the first state to set the rotation speeds of the traveling motors (that is, the traveling motor 36L and the traveling motor 36R) each at the first speed stage when the second switching valve 72 is set at the first position 72a, the first switching valve 71L is set at the first position 71L1, and the first switching valve 71R is set at the first position 71R1. The traveling switching valve 34 is set in the second state to set the rotation speeds of the traveling motors (that is, the traveling motor 36L and the traveling motor 36R) each at the second speed stage when the second switching valve 72 is set at the second position 72b, the first switching valve 71L is set at the second position 71L2, and the first switching valve 71R is set at the second position 71R2.

Accordingly, the traveling switching valve 34 allows the traveling motors (that is, the traveling motor 36L and the traveling motor 36R) to have a common rotation speed stage shiftable between the first speed stage that is a low speed stage and the second speed stage that is a high speed stage.

An operation device (that is, a traveling operating device) 54 is configured to apply a part of the operation fluid to the pressure-receiving portions 53a and 53b of each of the traveling pumps (that is, the left traveling pump 53L and the right traveling pump 53R) when a traveling operation member 59 is operated, thereby changing the angles of swash plates (referred to as swash plate angles) of the traveling pumps 53L and 53R. The operation device 54 includes the traveling operation member 59 and a plurality of operation valves 55.

The traveling operation member 59 is an operation lever that is supported by the operation valves 55 and swings in a lateral direction (that is, the machine width direction) or the fore-and-aft direction. The traveling operation member 59 is operable to turn to the right and to the left from a neutral position N, and to turn to the front and to the rear from the neutral position N. In other words, the traveling operation member 59 is swingable in at least four directions from the neutral position N. For convenience of explanation, the forward and backward directions, that is, the fore-and-aft direction, may be referred to as a first direction. The rightward and leftward directions, that is, the lateral direction (that is, the machine width direction), are may be referred to as a second direction.

The plurality of operation valves 55 are operated by the common single traveling operation member 59. The plurality of operation valves 55 are operated according to swinging of the traveling operation member 59. An output fluid line 40 is connected to the plurality of operation valves 55, and the part of operation fluid (that is, pilot fluid) from the first hydraulic pump P1 can be supplied to the operation valves 55 through the output fluid line 40. The plurality of operation valves 55 include an operation valve 55A, an operation valve 55B, an operation valve 55C, and an operation valve 55D.

When the traveling operation member 59 is swung forward, i.e., in one of the opposite fore-and-aft directions (one of opposite first directions) from the neutral position, or when a forward directional operation is performed, the operation valve 55A changes a pressure of operation fluid output therefrom according to an operation amount of the forward directional operation. When the traveling operation member 59 is swung backward, i.e., in the other of the opposite fore-and-aft directions (that is, in the other of the opposite first directions) from the neutral position, or when a backward directional operation is performed, the operation valve 55B changes a pressure of operation fluid output therefrom according to an operation amount of the backward directional operation. When the traveling operation member 59 is swung rightward, i.e., in one of the opposite lateral directions (one of opposite second directions) from the neutral position, or when a rightward directional operation is performed, the operation valve 55C changes a pressure of operation fluid output therefrom according to an operation amount of the rightward directional operation. When the traveling operation member 59 is swung leftward, i.e., in the other of the opposite lateral directions (that is, in the other of the opposite second directions), or when a leftward directional operation is performed, the operation valve 55D changes a pressure of operation fluid output therefrom according to an operation amount of the leftward directional operation.

The plurality of operation valves 55 are connected to the traveling pumps (that is, the traveling pump 53L and the traveling pump 53R) by the traveling fluid line 45. In other words, the traveling pumps (that is, the traveling pump 53L and the traveling pump 53R) are hydraulic equipment that are configured to be operated by pilot fluid that is operation fluid output from the operation valves 55 (that is, the operation valves 55A, 55B, 55C and 55D).

The traveling fluid line 45 has a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a pressure-receiving portion (referred to as a first pressure-receiving portion) 53a of the left traveling pump 53L, and is a fluid line through which operation fluid having a pressure (a pilot pressure) applied to the first pressure-receiving portion 53a flows when the traveling operation member 59 is operated. The second traveling fluid line 45b is a fluid line connected to a pressure-receiving portion (referred to as a second pressure-receiving portion) 53b of the left traveling pump 53L, and is a fluid line through which operation fluid having a pressure (a pilot pressure) applied to the second pressure-receiving portion 53b flows when the traveling operation member 59 is operated. The third traveling fluid line 45c is a fluid line connected to a pressure-receiving portion (referred to as a third pressure-receiving portion) 53a of the right traveling pump 53R, and is a fluid line through which operation fluid having a pressure (a pilot pressure) applied to the third pressure-receiving portion 53a flows when the traveling operation member 59 is operated. The fourth traveling fluid line 45d is a fluid line connected to a pressure-receiving portion (referred to as a fourth pressure-receiving portion) 53b of the right traveling pump 53R, and is a fluid line through which operation fluid having a pressure (pilot pressure) applied to the fourth pressure-receiving portion 53b flows when the traveling operation member 59 is operated. The fifth traveling fluid line 45e is a fluid line that connects the operation valves 55 to the first traveling fluid line 45a, the second traveling fluid line 45b, the third traveling fluid line 45c, and the fourth traveling fluid line 45d, respectively.

Figure 2:
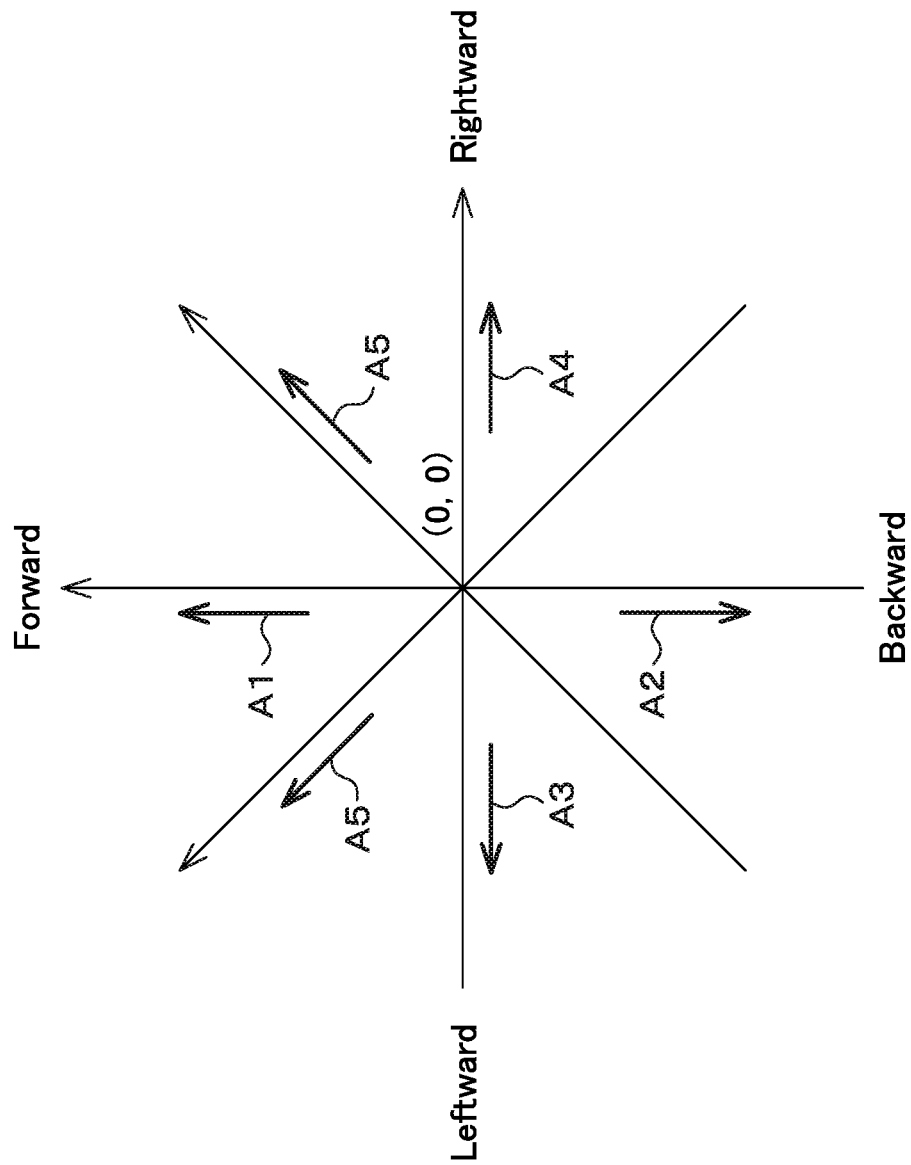
FIG. 2 is a view showing an operational direction and the like of a traveling operation member according to the first embodiment.

When the traveling operation member 59 is swung forward (in a direction indicated by an arrowed line A1 in FIGS. 1 and 2), the operation valve 55A is operated to output a pilot pressure. This pilot pressure is applied to the pressure-receiving portion 53a of the left traveling pump 53L via the first traveling fluid line 45a and to the pressure-receiving portion 53a of the right traveling pump 53R via the third traveling fluid line 45c. In this manner, the swash plate angles of the left traveling pump 53L and the right traveling pump 53R are changed, the left traveling motor 36L and the right traveling motor 36R rotate forwardly (referred to as forward rotation), and the working machine 1 travels straight forward.

When the traveling operation member 59 is swung backward (in a direction indicated by an arrowed line A2 in FIGS. 1 and 2), the operation valve 55B is operated to output a pilot pressure. This pilot pressure is applied to the pressure-receiving portion 53b of the left traveling pump 53L via the second traveling fluid line 45b and to the pressure-receiving portion 53b of the right traveling pump 53R via the fourth traveling fluid line 45d. In this manner, the swash plate angles of the left traveling pump 53L and the right traveling pump 53R are changed, the left traveling motor 36L and the right traveling motor 36R rotate reversely (referred to as backward rotation), and the working machine 1 travels straight backward.

When the traveling control member 59 is swung to the right (in a direction indicated by an arrowed line A3 in FIGS. 1 and 2), the control valve 55C is operated to output a pilot pressure. This pilot pressure is applied to the pressure-receiving portion 53a of the left traveling pump 53L via the first traveling fluid line 45a, and to the pressure-receiving portion 53b of the right traveling pump 53R via the fourth traveling fluid line 45d. In this manner, the swash plate angles of the left traveling pump 53L and the right traveling pump 53R are changed, and the left traveling motor 36L rotates forwardly and the right traveling motor 36R rotates reversely, and the working machine 1 spins to turn rightward (that is, the spin turn).

When the traveling control member 59 is swung to the left (in a direction indicated by an arrowed line A4 in FIGS. 1 and 2), the control valve 55D is operated to output a pilot pressure. This pilot pressure is applied to the pressure-receiving portion 53a of the right traveling pump 53R via the third traveling fluid line 45c, and to the pressure-receiving portion 53b of the left traveling pump 53L via the second traveling fluid line 45b. In this manner, the swash plate angles of the left traveling pump 53L and the right traveling pump 53R are changed, and the left traveling motor 36L rotates reversely and the right traveling motor 36R rotates forwardly, and the working machine 1 spins to turn leftward (that is, the spin turn).

When the traveling operation member 59 is swung in an oblique direction (in a direction indicated by an arrowed line A5 in FIG. 2), rotational directions and rotation speeds of the left traveling motor 36L and the right traveling motor 36R are determined based on a differential pressure between the pilot pressures applied to the pressure receiving portion 53a and the pressure receiving portion 53b, and the working machine 1 pivots to turn rightward or leftward while it travels forward or backward.

That is, when the traveling operation member 59 is swung obliquely forward to the left, the working machine 1 turns to the left while traveling forward at a speed corresponding to the swing angle of the traveling operation member 59. When the traveling operation member 59 is swung obliquely forward to the right, the working machine 1 turns to the right while traveling forward at a speed corresponding to the swing angle of the traveling operation member 59. When the traveling operation member 59 is swung obliquely backward to the left, the working machine 1 turns to the left while traveling backward at a speed corresponding to the swing angle of the traveling operation member 59. In addition, when the traveling operation member 59 is swung obliquely backward to the right, the working machine 1 turns to the right while it travels backward at a speed corresponding to the swing angle of the traveling operation member 59.

As shown in FIG. 1, the working machine 1 has a controller 60. The controller 60 performs various controls of the working machine 1 and is constituted of semiconductors such as a CPU, an MPU, electrical and electronic circuits, or the like. An accelerator 65, a mode switch 66, a speed changer switch 67, and a rotation detector 68, measurement device 69, and a setting switch 73 are electrically connected to the controller 60.

The mode switch 66 is a switch configured to enable or disable automatic deceleration. For example, the mode switch 66 is a switch capable of being switched on and off. The mode switch 66 when switched on allows the automatic deceleration to be performed. and the mode switch 66 when switched off, the mode switch 66 prevents the automatic deceleration from be performed.

The speed changer switch 67 is provided in the vicinity of the driver seat 8 and can be operated by a driver (an operator). The speed changer switch 67 is manually operable to shift each of rotation speed stages of the traveling motors 36L and 36R (that is, the left traveling motor 36L and right traveling motor 36R) to either the first speed stage or the second speed stage. For example, the speed changer switch 67 is a seesaw switch operable to selectively perform either an accelerating operation for shifting each of rotation speeds of the traveling motors 36L and 36R from the first speed stage to the second speed stage, or a decelerating operation for shifting each of rotation speeds of the traveling motors 36L and 36R from the second speed stage to the first speed stage.

The rotation detector 68 includes a sensor or the like configured to detect the rotation speed, especially, the prime mover rotation speed that is the rotation speed of the prime mover 32. The measurement device 69 is a sensor to detect pressures of a first relief valve 81a, a second relief valve 81b, a third relief valve 81c, and a fourth relief valve 81d. The setting switch 73 is a switch configured to switch an operation mode between an acquisition mode and a traveling mode.

The controller 60 has an automatic decelerator 61. The automatic decelerator 61 includes an electrical and electronic circuit or the like installed in the controller 60, a computer program stored in the controller 60, or the like.

The automatic decelerator 61 executes an automatic deceleration control when a traveling mode is executed and automatic deceleration is enabled, and does not execute the automatic deceleration control when the traveling mode is executed and the automatic deceleration is disabled. In addition, the automatic decelerator 61 does not perform the automatic deceleration control even in the acquisition mode.

In the automatic deceleration control, in a state where rotation speeds of the traveling motors (that is, the traveling motor 36L and the traveling motor 36R) are each set at the second speed stage, the rotation speeds of the traveling motors (that is, the traveling motor 36L and the traveling motor 36R) are each automatically reduced by shifting the rotation speed stage of each traveling motor from the second speed stage to the first speed stage when a predetermined condition (referred to as an automatic deceleration condition) is satisfied. In the automatic deceleration control, when the automatic deceleration condition is satisfied at least in a state where the traveling motors (that is, the left traveling motor 36L and the right traveling motor 36R) are each set at the second speed stage, the controller 60 demagnetizes a solenoid of the second switching valve 72 to switch the second switching valve 72 from the second position 72b to the first position 72a, and the rotation speeds of the traveling motors (that is, the left traveling motor 36L and the right traveling motor 36R) are reduced by shifting the rotation speed stage of each traveling motor from the second speed stage to the first speed stage. That is, when the automatic deceleration is performed, the controller 60 reduces the rotation speeds of both the left traveling motor 36L and the right traveling motor 36R by shifting the rotation speed stage of each of the traveling motors 36L and 36R from the second speed stage to the first speed stage.

When a restoration condition is satisfied after the automatic deceleration is performed, the automatic decelerator 61 magnetizes a solenoid of the second switching valve 72 to switch the second switching valve 72 from the first position 72a to the second position 72b, thereby accelerating the speed-reduced (decelerated) traveling motors (that is, the left traveling motor 36L and the right traveling motor 36R) by shifting the rotation speed stage of each of the traveling motors from the first speed stage to the second speed stage, that is, restoring the speed stages of the traveling motors. That is, the controller 60 increases rotation speeds of both the left traveling motor 36L and the right traveling motor 36R to restore their rotation speeds before the automatic deceleration by shifting the rotation speed stage of each of the traveling motors from the first speed stage to the second speed stage.

When the automatic deceleration is disabled, the controller 60 performs a manual switching control to switch the traveling motors (that is, the left traveling motor 36L and the right traveling motor 36R) to either the first speed stage or the second speed stage according to an operation of the speed changer switch 67. In the manual switching control, when the speed changer switch 67 is switched to a position corresponding to the first speed stage, the solenoid of the second switching valve 72 is demagnetized to set the traveling motors (that is, the left traveling motor 36L and the right traveling motor 36R) to the first speed stage. In the manual switching control, when the speed changer switch 67 is switched to the second speed stage, the traveling motors (that is, the left traveling motor 36L and the right traveling motor 36R) are set to the second speed stage by magnetizing the solenoid of the second switching valve 72. The controller 60 may allow the manual switching regardless of whether the automatic deceleration is enabled or disabled.

The accelerator 65 for setting a target rotation speed of the prime mover 32 is connected to the controller 60. The accelerator 65 is provided in the vicinity of the driver seat 8. The accelerator 65 is an acceleration lever supported swingably, an acceleration pedal supported swingably, an acceleration volume supported rotatably, an acceleration slider supported slidably, and the like. The accelerator 65 is not limited to the examples described above. In addition, a rotation detector 69 configured to detect an actual rotation speed of the prime mover 32 is connected to the controller 60. The rotation detector 69 allows the controller 60 to know an actual rotation speed of the prime mover 32. Based on an operation amount of the accelerator 65, the controller 60 determines a target rotation speed and controls an actual rotation speed until the actual rotation speed reaches the determined target rotation speed.

The controller 60 performs the automatic deceleration based on pressures in the circulation fluid lines 57h and 57i. A plurality of pressure detectors 80 are connected to the circulation fluid lines 57h and 57i. The plurality of pressure detectors 80 include a first pressure detector 80a, a second pressure detector 80b, a third pressure detector 80c, and a fourth pressure detector 80d. The first pressure detector 80a is provided on the passage of the circulation fluid line 57h interposed between the first port 82a of the left traveling pump 57L and the first port P11 of the left traveling motor 36L, and detects a first traveling pressure LF(t) that is a pressure of the operation fluid flowing in the passage of the circulation fluid line 57h interposed between the first port 82a of the left traveling pump 53L and the first port P11 of the left traveling motor 36L. The second pressure detector 80b is provided on the passage of the circulation fluid line 57h interposed between the second port 82b of the left traveling pump 53L and the second port P12 of the left traveling motor 36L, and detects a second traveling pressure LB(t) that is a pressure of the operation fluid flowing in the passage of the circulation fluid line 57h interposed between the second port 82b of the left traveling pump 53L and the second port P12 of the left traveling motor 36L. The third pressure detector 80c is provided on the passage of the circulation fluid line 57i interposed between the third port 82c of the right traveling pump 53R and the third port P13 of the right traveling motor 36R, and detects a third traveling pressure RF(t) that is a pressure of the operation fluid flowing in the passage of the circulation fluid line 57i interposed between the third port 82c of the right traveling pump 53R and the third port P13 of the right traveling motor 36R. The fourth pressure detector 80d is provided on the passage of the circulation fluid line 57i interposed between the fourth port 82d of the right traveling pump 53R and the fourth port P14 of the right traveling motor 36R, and detects a fourth traveling pressure RB(t) that is a pressure of the operation fluid flowing the passage of the right traveling pump 53R and the fourth port P14 of the right traveling motor 36R.

The controller 60 (that is, the automatic decelerator 61) performs the automatic deceleration based on the first traveling pressure LF (t, rpm) detected by the first pressure detector 80a, the second traveling pressure LB (t, rpm) detected by the second pressure detector 80b, the third traveling pressure RF (t, rpm) detected by the third pressure detector 80c, and the fourth traveling pressure RB (t, rpm) detected by the fourth pressure detector 80d. The sign (t, rpm) indicated in the first traveling pressure LF (t, rpm), the second traveling pressure LB (t, rpm), the third traveling pressure RF (t, rpm), and the fourth traveling pressure RB (t, rpm) is a notation indicating that the values are related to an actual rotation speed (rpm) of the prime mover at a certain time (t).

Specifically, the automatic decelerator 61 performs automatic deceleration when the first traveling pressure LF (t, rpm), the second traveling pressure LB (t, rpm), the third traveling pressure RF (t, rpm), and the fourth traveling pressure RB (t, rpm) become equal to or higher than the first deceleration threshold ST1 (rpm), which is determined according to a rotation speed of the prime mover, as shown in Expression 1.

$$\begin{pmatrix} LF_{(t,rpm)} \\ LB_{(t,rpm)} \\ RF_{(t,rpm)} \\ RB_{(t,rpm)} \end{pmatrix} \geq ST1 \text{ rpm)} \quad \text{(Expression 1)}$$

Alternatively, the controller 60 (that is, the automatic decelerator 61) acquires a third differential pressure a (t, rpm) and a fourth differential pressure c (t, rpm) that are effective traveling pressures corresponding to the right traveling pump 53R, and a first differential pressure b (t, rpm) and a second differential pressure d (t, rpm) that are effective differential pressures corresponding to the left traveling pump 53L, as shown in Expression 2. A sign "a (t, rpm)" indicates the effective third differential pressure in normal rotation of the right traveling motor 36R, a sign "b (t, rpm)" indicates the effective first differential pressure in normal rotation of the left traveling motor 36L, a sign "c (t, rpm)" indicates the effective fourth differential pressure in reverse rotation of the right traveling motor 36R, and a sign "d (t, rpm)" indicates the effective second differential pressure in reverse rotation of the left traveling motor 36L.

As shown in Expression 2, the first differential pressure b (t, rpm) is a value acquired by subtracting the second traveling pressure LB (t, rpm) from the first traveling pressure LF (t, rpm), the second differential pressure d (t, rpm) is a value acquired by subtracting the first traveling pressure LF (t, rpm) from the second traveling pressure LB (t, rpm), the third differential pressure a (t, rpm) is a value acquired by subtracting the fourth traveling pressure RB (t, rpm) from the third traveling pressure RF (t, rpm), and the fourth differential pressure c (t, rpm) is a value acquired by subtracting the third traveling pressure RF (t, rpm) from the fourth traveling pressure RB (t, rpm).

As shown in Expression 3, the automatic decelerator 61 performs automatic deceleration when the effective differential pressure a (t, rpm), the effective differential pressure b (t, rpm), the effective differential pressure c (t, rpm), and the effective differential pressure d (t, rpm) are equal to or higher than the second deceleration threshold ST2 (rpm) that is determined according to a rotation speed of the prime mover.

$$\begin{pmatrix} a_{(t,rpm)} \\ b_{(t,rpm)} \\ c_{(t,rpm)} \\ d_{(t,rpm)} \end{pmatrix} = \begin{pmatrix} RF_{(t,rpm)} - RB_{(t,rpm)} \\ LF_{(t,rpm)} - LB_{(t,rpm)} \\ RB_{(t,rpm)} - RF_{(t,rpm)} \\ LB_{(t,rpm)} - LF_{(t,rpm)} \end{pmatrix} \quad \text{(Expression 2)}$$

$$\begin{pmatrix} a_{(t,rpm)} \\ b_{(t,rpm)} \\ c_{(t,rpm)} \\ d_{(t,rpm)} \end{pmatrix} \geq ST2\text{(rpm)} \quad \text{(Expression 3)}$$

For automatic deceleration to be performed by the controller 60 (that is, the automatic decelerator 61) based on the first deceleration threshold ST1 (rpm), the first deceleration threshold ST1 (rpm) may be determined, at each rotation speed of the prime mover, for each of the first traveling pressure LF (t, rpm), the second traveling pressure LB (t, rpm), the third traveling pressure RF (t, rpm), and the fourth traveling pressure RB (t, rpm). FIG. 3A is a view showing an example of a relationship between a rotation speed of the prime mover and the first deceleration threshold ST1 (rpm) corresponding to each of the first traveling pressure LF (t, rpm), the second traveling pressure LB (t, rpm), the third traveling pressure RF (t, rpm), and the fourth traveling pressure RB (t, rpm). The values shown in FIG. 3A are just examples and are not limited thereto.

As shown in FIG. 3A, the first deceleration threshold ST1 (rpm) is set for each rotation speed of the prime mover. The first deceleration threshold ST1 (rpm) has a value corresponding to each of the first traveling pressure LF (t, rpm), the second traveling pressure LB (t, rpm), the third traveling pressure RF (t, rpm), and the fourth traveling pressure RB (t, rpm). The first deceleration threshold ST1 (rpm) is determined, in the same rotation speed of the prime mover, to be different for each of the first traveling pressure LF (t, rpm), the second traveling pressure LB (t, rpm), the third traveling pressure RF (t, rpm), and the fourth traveling pressure RB (t, rpm).

The first threshold information representing the first deceleration threshold ST1 (rpm) shown in FIG. 3A is stored in a storage 63. In performing automatic deceleration, the controller 60 (that is, the automatic decelerator 61) refers to a rotation speed of the prime mover detected by the rotation detector 69 and the first threshold information, and reads, from the first threshold information, the first deceleration threshold ST1 (rpm) for each of the first traveling pressure LF (t, rpm), the second traveling pressure LB (t, rpm), the third traveling pressure RF (t, rpm), and the fourth traveling pressure RB (t, rpm).

For example, when a rotation speed of the prime mover is 1500 rpm, the controller 60 determines the first deceleration threshold ST1 (rpm) for each of the first traveling pressure LF (t, rpm), the second traveling pressure LB (t, rpm), the third traveling pressure RF (t, rpm), and the fourth traveling pressure RB (t, rpm), that is, the first deceleration threshold ST1 (rpm) corresponding to the first traveling pressure LF (t, rpm) is 26.0 MPa, the first deceleration threshold ST1 (rpm) corresponding to the second traveling pressure LB (t, rpm) is 27.0 MPa, the first deceleration threshold ST1 (rpm) corresponding to the third traveling pressure RF (t, rpm) is 25.0 MPa, and the first deceleration threshold ST1 (rpm) corresponding to the fourth traveling pressure RB (t, rpm) is 25.7 MPa.

As described above, the controller 60 compares the first traveling pressure LF (t, rpm), second traveling pressure LB (t, rpm), third traveling pressure RF (t, rpm), and fourth traveling pressure RB (t, rpm) detected by the plurality of pressure detectors 80 to the first deceleration threshold ST1 (rpm) for each of the first traveling pressure LF (t, rpm), the second traveling pressure LB (t, rpm), the third traveling pressure RF (t, rpm), and the fourth traveling pressure RB (t, rpm). Then, the controller 60 performs automatic deceleration when Expression 1 is satisfied, and does not perform the automatic deceleration when Expression 1 is not satisfied.

In the above-described embodiment, the first threshold information is stored in the storage 63, and the first deceleration threshold ST1 corresponding to a rotation speed of the prime mover and the traveling pressures [the first traveling pressure LF (t, rpm), the second traveling pressure LB (t, rpm), the third traveling pressure RF (t, rpm), the fourth traveling pressure RB (t, rpm)] is determined based on the first threshold information; alternatively, a reference value and a correction coefficient corresponding to the first traveling pressure LF (t, rpm), the second traveling pressure LB (t, rpm), the third traveling pressure RF (t, rpm), and the fourth traveling pressure RB (t, rpm) may be prepared, and then the first deceleration threshold ST1 (rpm) corresponding to the traveling pressures [the first traveling pressure LF (t, rpm), the second traveling pressure LB (t, rpm), the third traveling pressure RF (t, rpm), the fourth traveling pressure RB (t, rpm)] may be determined by multiplying, dividing, adding, subtracting, or the like the correction coefficients or the like relative to the reference value according to a rotation speed of the prime mover.

When the controller 60 (that is, the automatic decelerator 61) performs automatic deceleration based on the second deceleration threshold ST2 (rpm), the controller 60 (that is, the automatic decelerator 61) may determine, at each rotation speed of the prime mover, the second deceleration threshold ST2 (rpm) corresponding to each of the first differential pressure b (t, rpm), the second differential pressure d (t, rpm), the third differential pressure a (t, rpm), and the fourth differential pressure c (t, rpm). FIG. 3B is a view showing an example of a relationship between a rotation speed of the prime mover and the second deceleration threshold ST2 (rpm) corresponding to each of the first differential pressure b (t, rpm), the second differential pressure d (t, rpm), the third differential pressure a (t, rpm), and the fourth differential pressure c (t, rpm). The values shown in FIG. 3B are just examples and are not limited thereto.

As shown in FIG. 3B, the second deceleration threshold ST2 (rpm) is determined for each rotation speed of the prime mover. The second deceleration threshold ST2 (rpm) has a value corresponding to each of the first differential pressure b (t, rpm), the second differential pressure d (t, rpm), the third differential pressure a (t, rpm), and the fourth differential pressure c (t, rpm). The second deceleration threshold ST2 (rpm) is determined, in the same rotation speed of the prime mover, to be different for each of the first differential pressure b (t, rpm), the second differential pressure d (t, rpm), the third differential pressure a (t, rpm), and the fourth differential pressure c (t, rpm).

The second threshold information representing the second deceleration threshold ST2 (rpm) shown in FIG. 3B is stored in the storage 63. In performing automatic deceleration, the controller 60 (that is, the automatic decelerator 61) refers to a rotation speed of the prime mover detected by the rotation detector 69 and the second threshold information, and reads, from the second threshold information, the second deceleration threshold ST2 (rpm) for each of the first differential pressure b (t, rpm), the second differential pressure d (t, rpm), the third differential pressure a (t, rpm), and the fourth differential pressure c (t, rpm).

For example, when a rotation speed of the prime mover is 1500 rpm, the controller 60 determines the second deceleration threshold ST2 (rpm) for each of the first differential pressure b (t, rpm), the second differential pressure d (t, rpm), the third differential pressure a (t, rpm), and the fourth differential pressure c (t, rpm), that is, the second deceleration threshold ST2 (rpm) corresponding to the first differential pressure b (t, rpm) is 24.0 MPa, the second deceleration threshold ST2 (rpm) corresponding to the second differential pressure d (t, rpm) is 25.0 MPa, the second deceleration threshold ST2 (rpm) corresponding to the third differential pressure a (t, rpm) is 23.0 MPa, and the second deceleration threshold ST2 (rpm) corresponding to the fourth differential pressure c (t, rpm) is 23.7 MPa.

The controller 60 calculates the first differential pressure b (t, rpm), the second differential pressure d (t, rpm), the third differential pressure a (t, rpm), and the fourth differential pressure c (t, rpm) based on the first traveling pressure LF (t, rpm), the second traveling pressure LB (t, rpm), the third traveling pressure RF (t, rpm), and the fourth traveling pressure RB (t, rpm) detected by the plurality of pressure detectors 80, and compares the calculated first differential pressure b (t, rpm), second differential pressure d (t, rpm), third differential pressure a (t, rpm), and fourth differential pressure c (t, rpm) with the second deceleration threshold ST2 (rpm) for each of the first differential pressure b (t, rpm), the second differential pressure d (t, rpm), the third differential pressure a (t, rpm), and the fourth differential pressure c (t, rpm). Then, when Expression 3 is satisfied, automatic deceleration is performed, and when Expression 3 is not satisfied, the automatic deceleration is not performed.

In the above-described embodiment, the second threshold information is stored in the storage 63, and the second deceleration threshold ST2 (rpm) corresponding to a rotation speed of the prime mover and the effective traveling pressures [first differential pressure b (t, rpm), second differential pressure d (t, rpm), third differential pressure a (t, rpm), fourth differential pressure c (t, rpm)] is determined based on the second threshold information; alternatively, a reference value and a correction coefficient corresponding to the first differential pressure b (t, rpm), the second differential pressure d (t, rpm), the third differential pressure a (t, rpm), and the fourth differential pressure c (t, rpm) may be prepared, and then the second deceleration thresholds ST2 (rpm) corresponding to the effective traveling pressures [first differential pressure b (t, rpm), second differential pressure d (t, rpm), third differential pressure a (t, rpm), fourth differential pressure c (t, rpm)] may be determined by multiplying, dividing, adding, subtracting, or the like the correction coefficient or the like relative to the reference value according to a rotation speed of the prime mover.

When the automatic deceleration is performed based on the first deceleration threshold ST1 (rpm), the controller 60 stops the automatic deceleration, i.e., restores the rotation speeds of the left and right traveling motors 36L and 36R before performing the automatic deceleration based on the first traveling pressure LF (t, rpm), the second traveling pressure LB (t, rpm), the third traveling pressure RF (t, rpm), and the fourth traveling pressure RB (t, rpm).

Specifically, the automatic decelerator 61 performs the speed-restoration (stopping the automatic deceleration) when the first traveling pressure LF (t, rpm), the second traveling pressure LB (t, rpm), the third traveling pressure RF (t, rpm), and the fourth traveling pressure RB (t, rpm) become equal to or lower than the first restoration threshold SK1 (rpm) determined according to a rotation speed of the prime mover, as shown in Expression 4.

$$\begin{pmatrix} LF_{(t,rpm)} \\ LB_{(t,rpm)} \\ RF_{(t,rpm)} \\ RB_{(t,rpm)} \end{pmatrix} < SK1 \text{ rpm)} \quad \text{(Expression 4)}$$

Alternatively, when the automatic decelerator 61 has performed automatic deceleration based on the second deceleration threshold ST2 (rpm), performs the speed-restoration (stopping of the automatic deceleration) when the first traveling pressure LF (t, rpm), the automatic decelerator 61 stops the automatic deceleration (to restore the rotation speeds of the left and right traveling motors 36L and 36R before performing the automatic deceleration) based on the first differential pressure b (t, rpm), the second differential pressure d (t, rpm), the third differential pressure a (t, rpm), and the fourth differential pressure c (t, rpm).

The controller 60 (that is, the automatic decelerator 61) performs the speed-restoration (stopping of automatic deceleration) when the first differential pressure b (t, rpm), the second differential pressure d (t, rpm), the third differential pressure a (t, rpm), and the fourth differential pressure c (t, rpm) become equal to or lower than the second restoration threshold SK2 (rpm) determined according to a rotation speed of the prime mover, as shown in Expression 5.

$$\begin{pmatrix} a_{(t,rpm)} \\ b_{(t,rpm)} \\ c_{(t,rpm)} \\ d_{(t,rpm)} \end{pmatrix} < SK2(\text{rpm}) \qquad \text{(Expression 5)}$$

In performing automatic deceleration based on the first restoration threshold SK1 (rpm), the controller 60 (that is, the automatic decelerator 61) is capable of determining, at each rotation speed of the prime mover, the first restoration threshold SK1 (rpm) corresponding to each of the first traveling pressure LF (t, rpm), the second traveling pressure LB (t, rpm), the third traveling pressure RF (t, rpm), and the fourth traveling pressure RB (t, rpm). FIG. 4A is a view showing an example of a relationship between a rotation speed of the prime mover and the first restoration threshold SK1 (rpm) corresponding to each of the first traveling pressure LF (t, rpm), the second traveling pressure LB (t, rpm), the third traveling pressure RF (t, rpm), and the fourth traveling pressure RB (t, rpm). The values shown in FIG. 4A are just examples and are not limited thereto.

As shown in FIG. 4A, the first restoration threshold SK1 (rpm) is determined for each rotation speed of the prime mover. The first restoration threshold SK1 (rpm) has a value corresponding to each of the first traveling pressure LF (t, rpm), the second traveling pressure LB (t, rpm), the third traveling pressure RF (t, rpm), and the fourth traveling pressure RB (t, rpm). The first restoration threshold SK1 (rpm) determined, in the same rotation speed of the prime mover, to be different for each of the first traveling pressure LF (t, rpm), the second traveling pressure LB (t, rpm), the third traveling pressure RF (t, rpm), and the fourth traveling pressure RB (t, rpm).

The third threshold information representing the first restoration threshold SK1 (rpm) shown in FIG. 4A is stored in the storage 63. In performing automatic deceleration, the controller 60 (that is, the automatic decelerator 61) refers to a rotation speed of the prime mover detected by the rotation detector 69 and the third threshold information, and reads, from the third threshold information, the first restoration threshold SK1 (rpm) for each of the first traveling pressure LF (t, rpm), the second traveling pressure LB (t, rpm), the third traveling pressure RF (t, rpm), and the fourth traveling pressure RB (t, rpm) corresponding to a rotation speed of the prime mover at the automatic deceleration.

For example, when a rotation speed of the prime mover is 1500 rpm, the controller 60 determines the first restoration threshold SK1 (rpm) corresponding to each of the first traveling pressure LF (t, rpm), the second traveling pressure LB (t, rpm), the third traveling pressure RF (t, rpm), and the fourth traveling pressure RB (t, rpm), that is, the first restoration threshold SK1 (rpm) corresponding to the first traveling pressure LF (t, rpm) is 16.0 MPa, the first restoration threshold SK1 (rpm) corresponding to the second traveling pressure LB (t, rpm) is 17.0 MPa, the first restoration threshold SK1 (rpm) corresponding to the third traveling pressure RF (t, rpm) is 15.0 MPa, and the first restoration threshold SK1 (rpm) corresponding to the fourth traveling pressure RB (t, rpm) is 15.7 MPa.

As described above, the controller 60 compares the first traveling pressure LF (t, rpm), second traveling pressure LB (t, rpm), third traveling pressure RF (t, rpm), and fourth traveling pressure RB (t, rpm) detected by the plurality of pressure detectors 80 to the first deceleration threshold ST1 (rpm) for each of the first traveling pressure LF (t, rpm), the second traveling pressure LB (t, rpm), the third traveling pressure RF (t, rpm), and the fourth traveling pressure RB (t, rpm). Then, the controller 60 performs speed-restoration to restore the rotation speeds of the left and right traveling motors 36L and 36R before performing the automatic deceleration when Expression 4 is satisfied, and does not perform the speed-restoration when Expression 4 is not satisfied.

In the above-described embodiment, the third threshold information is stored in the storage 63, and the first restoration threshold SK1 corresponding to a rotation speed of the prime mover and the traveling pressures [the first traveling pressure LF (t, rpm), the second traveling pressure LB (t, rpm), the third traveling pressure RF (t, rpm), the fourth traveling pressure RB (t, rpm)] is determined based on the third threshold information; alternatively, a reference value and a correction coefficient corresponding to the first traveling pressure LF (t, rpm), the second traveling pressure LB (t, rpm), the third traveling pressure RF (t, rpm), and the fourth traveling pressure RB (t, rpm) may be prepared, and then the first restoration threshold ST1 (rpm) corresponding to the traveling pressures [the first traveling pressure LF (t, rpm), the second traveling pressure LB (t, rpm), the third traveling pressure RF (t, rpm), the fourth traveling pressure RB (t, rpm)] may be determined by multiplying, dividing, adding, subtracting, or the like the correction coefficients or the like relative to the reference value according to a rotation speed of the prime mover.

When the controller 60 (that is, the automatic decelerator 61) performs automatic deceleration based on the second restoration threshold SK2 (rpm), the controller 60 (that is, the automatic decelerator 61) may determine, at each rotation speed of the prime mover, the second restoration threshold SK2 (rpm) corresponding to each of the first differential pressure b (t, rpm), the second differential pressure d (t, rpm), the third differential pressure a (t, rpm), and the fourth differential pressure c (t, rpm). FIG. 4B is a view showing an example of a relationship between a rotation speed of the prime mover and the second restoration threshold SK2 (rpm) corresponding to each of the first differential pressure b (t, rpm), the second differential pressure d (t, rpm), the third differential pressure a (t, rpm), and the fourth differential pressure c (t, rpm). The values shown in FIG. 4B are just examples and are not limited thereto.

As shown in FIG. 4B, the second restoration threshold SK2 (rpm) is determined for each rotation speed of the prime mover. The second restoration threshold SK2 (rpm) has a value corresponding to each of the first differential pressure b (t, rpm), the second differential pressure d (t, rpm), the third differential pressure a (t, rpm), and the fourth differential pressure c (t, rpm). The second restoration threshold SK2 (rpm) is determined, in the same rotation speed of the prime mover, to be different for each of the first differential pressure b (t, rpm), the second differential pressure d (t, rpm), the third differential pressure a (t, rpm), and the fourth differential pressure c (t, rpm).

The fourth threshold information representing the second restoration threshold SK2 (rpm) shown in FIG. 4B is stored in the storage 63. In performing automatic deceleration, the controller 60 (that is, the automatic decelerator 61) refers to a rotation speed of the prime mover detected by the rotation detector 69 and the fourth threshold information, and reads, from the fourth threshold information, the second restoration threshold SK2 (rpm) for each of the first differential pressure b (t, rpm), the second differential pressure d (t, rpm), the third differential pressure a (t, rpm), and the fourth differential pressure c (t, rpm).

For example, when a rotation speed of the prime mover is 1500 rpm, the controller 60 determines the second restoration threshold SK2 (rpm) for each of the first differential pressure b (t, rpm), the second differential pressure d (t, rpm), the third differential pressure a (t, rpm), and the fourth differential pressure c (t, rpm), that is, the second restoration threshold SK2 (rpm) corresponding to the first differential pressure b (t, rpm) is 14.0 MPa, the second restoration threshold SK2 (rpm) corresponding to the second differential pressure d (t, rpm) is 15.0 MPa, the second restoration threshold SK2 (rpm) corresponding to the third differential pressure a (t, rpm) is 13.0 MPa, and the second restoration threshold SK2 (rpm) corresponding to the fourth differential pressure c (t, rpm) is 13.7 MPa.

The controller 60 calculates the first differential pressure b (t, rpm), the second differential pressure d (t, rpm), the third differential pressure a (t, rpm), and the fourth differential pressure c (t, rpm) based on the first traveling pressure LF (t, rpm), the second traveling pressure LB (t, rpm), the third traveling pressure RF (t, rpm), and the fourth traveling pressure RB (t, rpm) detected by the plurality of pressure detectors 80, and compares the calculated first differential pressure b (t, rpm), second differential pressure d (t, rpm), third differential pressure a (t, rpm), and fourth differential pressure c (t, rpm) with the second restoration threshold SK2 (rpm) for each of the first differential pressure b (t, rpm), the second differential pressure d (t, rpm), the third differential pressure a (t, rpm), and the fourth differential pressure c (t, rpm). Then, when Expression 5 is satisfied, the speed-restoration is performed, and when Expression 5 is not satisfied, the speed-restoration is not performed.

In the above-described embodiment, the fourth threshold information is stored in the storage 63, and the second restoration threshold SK2 (rpm) corresponding to a rotation speed of the prime mover and the effective traveling pressures [first differential pressure b (t, rpm), second differential pressure d (t, rpm), third differential pressure a (t, rpm), fourth differential pressure c (t, rpm)] is determined based on the fourth threshold information; alternatively, a reference value and a correction coefficient corresponding to the first differential pressure b (t, rpm), the second differential pressure d (t, rpm), the third differential pressure a (t, rpm), and the fourth differential pressure c (t, rpm) may be prepared, and then the second restoration thresholds ST2 (rpm) corresponding to the effective traveling pressures [first differential pressure b (t, rpm), second differential pressure d (t, rpm), third differential pressure a (t, rpm), fourth differential pressure c (t, rpm)] may be determined by multiplying, dividing, adding, subtracting, or the like the correction coefficient or the like relative to the reference value according to a rotation speed of the prime mover.

The working machine 1 includes the machine body 2, the left traveling device 5L provided on a left portion of the machine body 2, the right traveling device 5R provided on a right portion of the machine body 2, the left traveling motor 36L configured to output a power transmitted to the left traveling device 5L, the right traveling motor 36R configured to output a power transmitted to the right traveling device 5R, the left traveling pump 53L to deliver operation fluid supplied to the left traveling motor 36L, a part of the operation fluid being used to control the operation fluid delivery of the left traveling pump 53L, the right traveling pump 53R to deliver operation fluid supplied to the right traveling motor 36R, a part of the operation fluid being used to control the operation fluid delivery of the right traveling pump 53R, the first circulation fluid line 57h connecting the left traveling pump 53L to the left traveling motor 36L, the left traveling motor 36L having the first port 82a and the second port 82b to receive and discharge the operation fluid from and to the left traveling pump 53L via the first circulation fluid line 57h, the second circulation fluid line 57i connecting the right traveling pump 53R to the right traveling motor 36R, the right traveling motor 36R having the third port 82c and the fourth port 82d to receive and discharge the operation fluid from and to the right traveling pump 53R via the second circulation fluid line 57i, the first pressure detector 80a to detect a first traveling pressure LF (t, rpm) that is a pressure of the operation fluid flowing in a portion of the first circulation fluid line 57h interposed between the left traveling pump 53L and the first port 82a of the left traveling motor 36L when the left traveling motor 36L rotates, the second pressure detector 80b to detect a second traveling pressure LB (t, rpm) that is a pressure of the operation fluid flowing in another portion of the first circulation fluid line 57h interposed between the left traveling pump 53L and the second port 82b of the left traveling motor 36L when the left traveling motor 36L rotates, the third pressure detector 80c to detect a third traveling pressure RF (t, rpm) that is a pressure of the operation fluid flowing in a portion of the second circulation fluid line 57i interposed between the right traveling pump 53R and the third port 82c of the right traveling motor 36R when the right traveling motor 36R rotates, the fourth pressure detector 80d to detect a fourth traveling pressure RB (t, rpm) that is a pressure of the operation fluid flowing in another portion of the second circulation fluid line 57i interposed between the right traveling pump 53R and the fourth port 82d of the right traveling motor 36R when the right traveling motor 36R rotates, and the controller 60 configured or programmed to determine a first deceleration threshold ST1 corresponding to each of the first traveling pressure LF (t, rpm), the second traveling pressure LB (t, rpm), the third traveling pressure RF (t, rpm), and the fourth traveling pressure RB (t, rpm), to perform automatic deceleration to reduce rotation speeds of the left traveling motor 36L and the right traveling motor 36R, and to judge whether to perform the automatic deceleration based on the first traveling pressure LF (t, rpm), the second traveling pressure LB (t, rpm), the third traveling pressure RF (t, rpm), and the fourth traveling pressure RB (t, rpm).

According to this configuration, automatic deceleration can be performed or not performed, based on the first deceleration threshold ST1 (rpm), according to the respective pressures of operation fluid supplied from the left traveling pump 53L and the right traveling pump 53R, so that the automatic deceleration can be performed smoothly according to various states of the working machine 1.

The controller 60 is configured or programmed to determine each rotation speed of the prime mover, the first deceleration threshold ST1 (rpm) corresponding to each rotation speed of the prime mover 32 and corresponding to each of the first traveling pressure LF (t, rpm), the second traveling pressure LB (t, rpm), the third traveling pressure RF (t, rpm), and the fourth traveling pressure RB (t, rpm). According to this configuration, automatic deceleration can be performed according to variation in a rotation speed of the prime mover.

The controller 60 is configured or programmed to determine the first deceleration threshold ST1 (rpm) corresponding to one rotation speed of the prime mover 32, and varying to correspond to each of the first traveling pressure LF (t, rpm), second traveling pressure LB (t, rpm), third traveling pressure RF (t, rpm), and fourth traveling pressure RB (t, rpm).

According to this configuration, even at the same rotation speed of the prime mover, automatic deceleration can be performed or not performed depending on the respective pressures of operation fluid supplied from the left traveling pump 53L and the right traveling pump 53R.

The controller 60 is configured or programmed to refer to the first traveling pressure LF (t, rpm), the second traveling pressure LB (t, rpm), the third traveling pressure RF (t, rpm), and the fourth traveling pressure RB (t, rpm) during rotation of the prime mover 32 at a predetermined rotation speed, and to performs the automatic deceleration when any one of the first traveling pressure LF (t, rpm), the second traveling pressure LB (t, rpm), the third traveling pressure RF (t, rpm), and the fourth traveling pressure RB (t, rpm) is equal to or higher than the first deceleration threshold ST1 (rpm).

According to this configuration, automatic deceleration can be performed based on the traveling pressures [first traveling pressure LF (t, rpm), second traveling pressure LB (t, rpm), third traveling pressure RF (t, rpm), fourth traveling pressure RB (t, rpm)] which vary according to the respective pressures of operation fluid supplied from the left traveling pump 53L and the right traveling pump 53R. Accordingly, the automatic deceleration can be performed according to a state of the working machine 1, for example, according to a work being performed by the working machine 1.

The controller 60 is configured or programmed to determine the first restoration threshold SK1 (rpm) corresponding to each of the first traveling pressure LF (t, rpm), the second traveling pressure LB (t, rpm), the third traveling pressure RF (t, rpm), and the fourth traveling pressure RB (t, rpm), to perform speed-restoration to restore the rotation speeds of the left and right traveling motors 36L and 36R before performing the automatic deceleration, and to judge whether to perform the speed-restoration based on the determined first restoration threshold SK1 (rpm), the first traveling pressure LF (t, rpm), the second traveling pressure LB (t, rpm), the third traveling pressure RF (t, rpm), and the fourth traveling pressure RB (t, rpm). According to this configuration, after the automatic deceleration is performed, the speed-restoration can be performed based on the respective pressures of operation fluids supplied from the left traveling pump 53L and the right traveling pump 53R.

The controller 60 is configured or programmed to determine the first restoration threshold SK1 (rpm) corresponding to each rotation speed of the prime mover 32 and corresponding to each of the first traveling pressure LF (t, rpm), the second traveling pressure LB (t, rpm), the third traveling pressure RF (t, rpm), and the fourth traveling pressure RB (t, rpm). According to this configuration, the rotation speeds of the left and right traveling motors 36L and 36R before performing the automatic deceleration can be restored based on a rotation speed of the prime mover.

The controller 60 is configured or programmed to determine the first restoration threshold SK1 (rpm) corresponding to one rotation speed of the prime mover 32, and varying to correspond to each of the first traveling pressure LF (t, rpm), second traveling pressure (t, rpm), third traveling pressure RF (t, rpm), and fourth traveling pressure RB (t, rpm). According to this configuration, even at the same rotation speed of the prime mover, the rotation speeds of the left and right traveling motors 36L and 36R before performing the automatic deceleration can be restored or not restored depending on the respective pressures of operation fluid supplied from the left traveling pump 53L and the right traveling pump 53R.

The controller 60 is configured or programmed to refer to each of the first traveling pressure LF (t, rpm), the second traveling pressure LB (t, rpm), the third traveling pressure RF (t, rpm), and the fourth traveling pressure RB (t, rpm) during rotation of the prime mover 32 at a predetermined rotation speed, and to perform the speed-restoration when any one of the first traveling pressure LF (t, rpm), the second traveling pressure LB (t, rpm), the third traveling pressure RF (t, rpm), and the fourth traveling pressure RB (t, rpm) is equal to or lower than the first restoration threshold SK1 (rpm).

According to this configuration, the rotation speeds of the left and right traveling motors 36L and 36R before performing the automatic deceleration can be restored based on the traveling pressures [first traveling pressure LF (t, rpm), second traveling pressure LB (t, rpm), third traveling pressure RF (t, rpm), and fourth traveling pressure RB (t, rpm)] which vary according to the respective pressures of operation fluid supplied from the left traveling pump 53L and the right traveling pump 53R.

The working machine 1 has the controller 60 configured or programmed to determine the second deceleration threshold ST2 (rpm) corresponding to each of the first differential pressure b (t, rpm) acquired by subtracting the second traveling pressure LB (t, rpm) from the first traveling pressure LF (t, rpm), the second differential pressure d (t, rpm) acquired by subtracting the first traveling pressure LF (t, rpm) from the second traveling pressure LB (t, rpm), the third differential pressure a (t, rpm) acquired by subtracting the fourth traveling pressure RB (t, rpm) from the third traveling pressure RF (t, rpm), and the fourth differential pressure c (t, rpm) acquired by subtracting the third traveling pressure RF (t, rpm) from the fourth traveling pressure RB (t, rpm), to perform automatic deceleration to reduce rotation speeds of the left traveling motor 36L and the right traveling motor 36R, and to judge whether to perform the automatic deceleration based on the determined second deceleration threshold ST2 (rpm), the first differential pressure b (t, rpm), the second differential pressure d (t, rpm), the third differential pressure a (t, rpm), and the fourth differential pressure c (t, rpm).

According to this configuration, the automatic deceleration can be performed or not performed based on the second deceleration threshold ST2 (rpm) according to the respective pressures of operation fluid supplied from the left traveling pump 53L and the right traveling pump 53R, so that the automatic deceleration can be performed smoothly according to various states of the working machine 1.

The controller 60 is configured or programmed to determine the second deceleration threshold ST2 (rpm) corresponding to each rotation speed of the prime mover 32 and corresponding to each of the first differential pressure b (t, rpm), the second differential pressure d (t, rpm), the third differential pressure a (t, rpm), and the fourth differential pressure c (t, rpm). According to this configuration, automatic deceleration can be performed based on a rotation speed of the prime mover.

The controller 60 is configured or programmed to determine the second deceleration threshold ST2 (rpm) corresponding to one rotation speed of the prime mover 32, and varying to correspond to each of the first differential pressure b (t, rpm), second differential pressure d (t, rpm), third differential pressure a (t, rpm), and fourth differential pressure c (t, rpm). According to this configuration, even at the same rotation speed of the prime mover, automatic deceleration can be performed or not performed depending on the respective pressures of operation fluid supplied from the left traveling pump 53L and the right traveling pump 53R.

The controller 60 is configured or programmed to calculate the first differential pressure b (t, rpm), the second differential pressure d (t, rpm), the third differential pressure a (t, rpm), and the fourth differential pressure c (t, rpm) during rotation of the prime mover 32 at a predetermined rotation speed, and to perform the automatic deceleration when any one of the calculated first differential pressure b (t, rpm), second differential pressure d (t, rpm), third differential pressure a (t, rpm), and fourth differential pressure c (t, rpm) is equal to or higher than the second deceleration threshold ST2 (rpm).

According to this configuration, the automatic deceleration can be performed according to the effective traveling pressures [first differential pressure b (t, rpm), second differential pressure d (t, rpm), third differential pressure a (t, rpm), fourth differential pressure c (t, rpm)] which vary according to the respective pressure of operation fluid supplied from the left traveling pump 53L and the right traveling pump 53R.

The controller 60 is configured or programmed to determine the second restoration threshold SK2 (rpm) corresponding to each of the first differential pressure b (t, rpm), the second differential pressure d (t, rpm), the third differential pressure a (t, rpm), and the fourth differential pressure c (t, rpm), to perform speed-restoration to restore the rotation speeds of the left and right traveling motors 36L and 36R before performing the automatic deceleration, and to judge whether to perform the speed-restoration based on the determined second restoration threshold SK2 (rpm), the first differential pressure b (t, rpm), the second differential pressure d (t, rpm), the third differential pressure a (t, rpm), and the fourth differential pressure c (t, rpm). According to this configuration, the speed-restoration can be performed based on the effective traveling pressures [first differential pressure b (t, rpm), second differential pressure d (t, rpm), third differential pressure a (t, rpm), fourth differential pressure c (t, rpm)] which vary according to the respective pressures of operation fluid delivered from the left traveling pump 53L and the right traveling pump 53R.

The controller 60 is configured or programmed to determine the second restoration threshold SK2 (rpm) corresponding to each rotation speed of the prime mover 32 and corresponding to the first differential pressure b (t, rpm), the second differential pressure d (t, rpm), the third differential pressure a (t, rpm), and the fourth differential pressure c (t, rpm). According to this configuration, automatic deceleration can be performed according to a rotation speed of the prime mover.

The controller 60 is configured or programmed to determine the second restoration threshold SK2 (rpm) corresponding to one rotation speed of the prime mover, and varying to correspond to each of the first differential pressure b (t, rpm), second differential pressure d (t, rpm), third differential pressure a (t, rpm), and fourth differential pressure c (t, rpm). According to this configuration, even at the same rotation speed of the prime mover, automatic deceleration can be performed or not performed depending on the respective pressures of operation fluid supplied from the left traveling pump 53L and the right traveling pump 53R.

The controller 60 is configured or programmed to calculate the first differential pressure b (t, rpm), the second differential pressure d (t, rpm), the third differential pressure a (t, rpm), and the fourth differential pressure c (t, rpm) during rotation of the prime mover 32 at a predetermined rotation speed, and to perform the speed-restoration when any one of the calculated first differential pressure b (t, rpm), the second differential pressure d (t, rpm), the third differential pressure a (t, rpm), and the fourth differential pressure c (t, rpm) is equal to or lower than the second restoration threshold SK2 (rpm). According to this configuration, the speed-restoration can be performed based on the effective traveling pressures [first differential pressure b (t, rpm), second differential pressure d (t, rpm), third differential pressure a (t, rpm), fourth differential pressure c (t, rpm)] which vary according to the respective pressures of operation fluids supplied from the left traveling pump 53L and the right traveling pump 53R.

In the above-described embodiment, the left traveling motor 36L and the right traveling motor 36R are configured to simultaneously switch to the first speed stage or the second speed stage, and the automatic deceleration is also performed simultaneously on the left traveling motor 36L and the right traveling motor 36R; however, the automatic deceleration may be performed in a state where at least one of the left traveling motor 36L and the right traveling motor 36R is switched to the first speed stage and the other of the left traveling motor 36L and the right traveling motor 36R is at the second speed stage.

The traveling motors (that is, the left traveling motor 36L and the right traveling motor 36R) may be axial piston motors or radial piston motors. Regardless of whether the traveling motor is an axial piston motor or a radial piston motor, the traveling motor can switch to the first speed stage by increasing the motor capacity, and can switch to the second speed stage by decreasing the motor capacity.

Second Embodiment

A second embodiment of the present invention will be described with reference to the drawings. Components similar to those described in the first embodiment are given the same reference numerals and detailed descriptions thereof will be omitted.

A hydraulic system for the working device and the working device having this hydraulic system according to this embodiment have the same configuration as that described based on FIGS. 1 and 11 in the first embodiment.

Referring to FIG. 1, the controller 60 according to the present embodiment performs automatic deceleration based on pressures in the circulation fluid lines 57h and 57i. A plurality of pressure detectors 80 are connected to the circulation fluid lines 57h and 57i. The plurality of pressure detectors 80 includes a first pressure detector 80a, a second pressure detector 80b, a third pressure detector 80c, and a fourth pressure detector 80d. The first pressure detector 80a is provided in the circulation fluid line 57h near a first port P11 of the left traveling motor 36L, and detects a pressure on the first port P11 side as a first traveling pressure LF(t). The second pressure detector 80b is provided in the circulation fluid line 57h near the second port P12 of the left traveling motor 36L, and detects a pressure on the second port P12 side as a second traveling pressure LB(t). The third pressure detector 80c is provided in the circulation fluid line 57i near the third port P13 of the right traveling motor 36R, and detects a pressure on the third port P13 side as a third traveling pressure RF(t). The fourth pressure detector 80d is provided in the circulation fluid line 57i near the fourth port P14 of the right traveling motor 36R, and detects a pressure on the fourth port P14 side as a fourth traveling pressure RB(t).

The controller 60 (that is, the automatic decelerator 61) performs automatic deceleration based on the first traveling pressure LF (t, rpm) detected by the first pressure detector 80a, the second traveling pressure LB (t, rpm) detected by the second pressure detector 80b, the third traveling pressure RF (t, rpm) detected by the third pressure detector 80c, and the fourth traveling pressure RB (t, rpm) detected by the fourth pressure detector 80d. The signs "(t, rpm)" indicated in the first traveling pressure LF (t, rpm), the second traveling pressure LB (t, rpm), the third traveling pressure RF (t, rpm), and the fourth traveling pressure RB (t, rpm) represent that the pressures are associated with an actual rotation speed of the prime mover at a certain time t.

Specifically, the automatic decelerator 61 performs automatic deceleration when the first traveling pressure LF (t, rpm), the second traveling pressure LB (t, rpm), the third traveling pressure RF (t, rpm), and the fourth traveling pressure RB (t, rpm) become equal to or higher than the deceleration threshold ST (rpm) that is determined according to a rotation speed of the prime mover, as shown in Expression 6.

$$\begin{pmatrix} LF_{(t,rpm)} \\ LB_{(t,rpm)} \\ RF_{(t,rpm)} \\ RB_{(t,rpm)} \end{pmatrix} \geq ST \text{ rpm)} \quad \text{(Expression 6)}$$

The controller 60 (that is, the automatic decelerator 61) determines the deceleration threshold ST (rpm) based on a first traveling relief pressure w1 of the first relief valve 81a, a second traveling relief pressure w2 of the second relief valve 81b, a third traveling relief pressure w3 of the third relief valve 81c, and a fourth traveling relief pressure w4 of the fourth relief valve 81d. For example, the controller 60 (that is, the automatic decelerator 61) determines the deceleration threshold ST (rpm) based on a correction coefficient η1 and each of the first traveling relief pressure w1, the second traveling relief pressure w2, the third traveling relief pressure w3, and the fourth traveling relief pressure w4.

Specifically, when the controller 60 (that is, the automatic decelerator 61) enters an acquisition mode, the controller 60 first acquires the first traveling relief pressure w1, the second traveling relief pressure w2, the third traveling relief pressure w3, and the fourth traveling relief pressure w4 at a predetermined rotation speed of the prime mover while changing the rotation speed of the prime mover. That is, the controller 60 (that is, the automatic decelerator 61) acquires the traveling relief pressures (that is, the first traveling relief pressure w1, the second traveling relief pressure w2, the third traveling relief pressure w3, and the fourth traveling relief pressure w4) that are determined in correspondence with a prime mover rotation speed. Then, the controller 60 (that is, the automatic decelerator 61) determines the deceleration threshold ST (rpm) according to a traveling relief pressure determined corresponding to a prime mover rotation speed. The traveling relief pressure is a pressure of operation fluid at which the first relief valve 81a, the second relief valve 81b, the third relief valve 81c, and the fourth relief valve 81d start to be operated, or at which the first relief valve 81a, the second relief valve 81b, the third relief valve 81c, and the fourth relief valve 81d start to be operated and then become stabilized.

For convenience of explanation, the first traveling relief pressure w1 corresponding to a prime mover rotation speed is referred to as the first traveling relief pressure w1 (rpm), the second traveling relief pressure w2 corresponding to a prime mover rotation speed is referred to as the second traveling relief pressure w2 (rpm), the third traveling relief pressure w3 corresponding to a prime mover rotation speed is referred to as the third traveling relief pressure w3 (rpm), the fourth traveling relief pressure w4 corresponding to a prime mover rotation speed is referred to as the fourth traveling relief pressure w4 (rpm). The deceleration threshold ST set based on the first traveling relief pressure w1 (rpm), the second traveling relief pressure w2 (rpm), the third traveling relief pressure w3 (rpm) and the fourth traveling relief pressure w4 (rpm) is represented as the deceleration threshold ST (rpm). In determining the deceleration threshold ST (rpm), the controller 60 (that is, the automatic decelerator 61) refers to the first traveling relief pressure w1 (rpm), the second traveling relief pressure w2 (rpm), the third traveling relief pressure w3 (rpm), and the fourth traveling relief pressure w4 (rpm) as shown in Expression 7. In addition, the η1 in Expression 7 is a correction coefficient. As shown in Expression 7, the controller 60 (that is, the automatic decelerator 61) multiplies each of the first traveling relief pressure w1 (rpm), the second traveling relief pressure w2 (rpm), the third traveling relief pressure w3 (rpm), and the fourth traveling relief pressure w4 (rpm) by the correction coefficient η1 to determine the deceleration threshold ST (rpm).

$$ST(\text{rpm}) = \begin{pmatrix} w3_{(rpm)} \\ w1_{(rpm)} \\ w4_{(rpm)} \\ w2_{(rpm)} \end{pmatrix} \times \eta_1 \quad \text{(Expression 7)}$$

In more detail, in the acquisition mode, the control device 60 (that is, the automatic decelerator 61) set a prime mover rotation speed to a predetermined speed. The measurement device 69 (see FIG. 1) measures the first traveling relief pressure w1 (rpm), the second traveling relief pressure w2 (rpm), the third traveling relief pressure w3 (rpm), and the fourth traveling relief pressure w4 (rpm) at a predetermined rotation speed of the prime mover.

In the acquisition mode, a prime mover rotation speed in the working machine 1 is changed at least in a range from a prime mover rotation speed corresponding to an idling speed to the maximum prime mover rotation speed, and every time when the prime mover rotation speed is changed, the first traveling relief pressure w1 (rpm), the second traveling relief pressure w2 (rpm), the third traveling relief pressure w1 (rpm), and the fourth traveling relief pressure w4 (rpm) are measured. In the acquisition mode, as shown in FIG. 5, the first traveling relief pressure w1 (rpm), the second traveling relief pressure w2 (rpm), the third traveling relief pressure w3 (rpm), and the fourth traveling relief pressure w4 (rpm) corresponding to the prime mover rotation speed are stored in the storage 63. That is, the first traveling relief pressure w1 (rpm), the second traveling relief pressure w2 (rpm), the third traveling relief pressure w3 (rpm), and the fourth traveling relief pressure w4 (rpm) are stored in the storage 63 in association with the prime mover rotation speeds.

When a traveling operation or the like is performed in the working machine 1, that is, when the working machine 1 is in a traveling mode, the control device 60 (that is, the automatic decelerator 61) determines the deceleration threshold ST (rpm) according to a state of the working machine 1. That is, the controller 60 (that is, the automatic decelerator 61) determines (changes) the deceleration threshold ST (rpm) by changing the correction coefficient $\eta 1$ according to the prime mover rotation speed.

The automatic decelerator 61 increases the correction coefficient $\eta 1$ as a prime mover rotation speed is increased, and decreases the correction coefficient $\eta 1$ as a prime mover rotation speed is decreased. Alternatively, the automatic decelerator 61 decreases the correction coefficient $\eta 1$ as a prime mover rotation speed is increased, and increases the correction coefficient $\eta 1$ as a prime mover rotation speed is decreased.

When the controller 60 (that is, the automatic decelerator 61) satisfies Expression 8 in a state of automatic deceleration (that is, deceleration from the second speed stage to the first speed stage), the automatic deceleration is stopped, that is, the rotation speeds of the first and second traveling motors 36L and 36R set at the second speed stage before performing the automatic deceleration is restored by shifting the speed stage of each of the first and second traveling motors 36L and 36R from the first speed stage to the second speed stage. That is, as shown in Expression 8, the controller 60 (that is, the automatic decelerator 61) restores the rotation speeds of the left and right traveling motors 36L and 36R before performing the automatic deceleration when any one of the first traveling pressure LF (t, rpm), the second traveling pressure LB (t, rpm), the third traveling pressure RF (t, rpm), and the fourth traveling pressure RB (t, rpm) becomes lower than the restoration threshold SE (rpm).

$$\begin{pmatrix} LF_{(t,rpm)} \\ LB_{(t,rpm)} \\ RF_{(t,rpm)} \\ RB_{(t,rpm)} \end{pmatrix} \leq SE(\text{rpm}) \qquad \text{(Expression 8)}$$

The controller 60 (that is, the automatic decelerator 61) determines the restoration threshold SE (rpm) based on the first traveling relief pressure w1 (rpm), the second traveling relief pressure w2 (rpm), the third traveling relief pressure w3 (rpm), and the fourth traveling relief pressure w4 (rpm) in a similar manner to the deceleration threshold ST (rpm). For example, as shown in Expression 9a, the controller 60 (that is, the automatic decelerator 61) determines the restoration threshold SE (rpm) by multiplying each of the first traveling relief pressure w1 (rpm), the second traveling relief pressure w2 (rpm), the third traveling relief pressure w3 (rpm), and the fourth traveling relief pressure w4 (rpm) by a correction coefficient $\eta 4$.

Alternatively, the controller 60 (that is, the automatic decelerator 61) determines the restoration threshold SE (rpm) based on a restoration reference value $\gamma_{(rpm)}$ and the correction threshold $\eta 4$, as shown in Expression 9b.

$$SE(\text{rpm}) = \begin{pmatrix} w3_{(rpm)} \\ w1_{(rpm)} \\ w4_{(rpm)} \\ w2_{(rpm)} \end{pmatrix} \times \eta_4 \qquad \text{(Expression 9a)}$$

$$SE(\text{rpm}) = \gamma_{(rpm)} \pm \begin{pmatrix} w3_{(rpm)} \\ w1_{(rpm)} \\ w4_{(rpm)} \\ w2_{(rpm)} \end{pmatrix} \times \eta_4 \qquad \text{(Expression 9b)}$$

The controller 60 (that is, the automatic decelerator 61) can change the restoration threshold SE (rpm) by changing the correction coefficient $\eta 4_{(rpm)}$.

The work machine 1 includes the machine body 2, the prime mover 32 provided on the machine body 2, the left traveling device 5L provided on a left portion of the machine body 2, the right traveling device 5R provided on a right portion of the machine body 2, the left traveling motor 36L configured to output a power transmitted to the left traveling device 5L and to have a rotation speed set at a speed stage shiftable between a first speed stage and a second speed stage higher than the first speed stage, the right traveling motor 36R configured to output a power transmitted to the right traveling device 5R and to have a rotation speed set at a speed stage shiftable between a first speed stage and a second speed stage higher than the first speed stage, the left traveling pump 53L having the first port 82a to deliver operation fluid for normal rotation of the left traveling motor 36L and the second port 82b to deliver operation fluid for reverse rotation of the left traveling motor 36L, the right traveling pump 53R having the third port 82c to deliver operation fluid to normal rotation of the right traveling motor 36R and the fourth port 82d to deliver operation fluid for reverse rotation of the right traveling motor 36R, the first circulation fluid line 57h including a passage extended from the first port 82a of the left traveling pump 53L and another passage extended from the second port 82b of the left traveling pump 53L and connecting the passages extended from the first and second ports 82a and 82b of the left traveling pump 53L to the left traveling motor 36L, the second circulation fluid line 57i including a passage extended from the third port 82c of the right traveling pump 53L and another passage extended from the fourth port 82d of the right traveling pump 53R and connecting the passages extended from the third and fourth ports 82c and 82d to the right traveling motor 36R, the first relief valve 81a connected to the passage of the first circulation fluid line 57h extended from the first port 82a, the second relief valve 81b connected to the passage of the first circulation fluid line 57h extended from the second port 82b, the third relief valve 81c connected to the passage of the second circulation fluid line 57i extended from the third port 82c, the fourth relief valve 81d connected to the passage of the second circulation fluid line 57i extended from the fourth port 82d, the traveling operation device 54 configured to control the operation fluid delivery of any one of the left traveling pump 53L and the right traveling pump 53R by applying a pressure of a part of the operation fluid according to operation of the traveling operation member 59, the traveling fluid line 45 connecting the traveling operation device 54 to the left traveling pump 36L and right traveling pump 36R to supply the part of operation fluid, and the controller 60 configured or programmed to perform automatic deceleration to automatically reduce the rotation speeds of the left and right traveling motors 36L and 36R each set at the second speed stage by shifting the speed stage of each of the left and right traveling motors 36L and 36R from the second speed stage to the first speed stage. The controller 60 is configured or programmed to determine a deceleration threshold based on a first traveling relief pressure of the first relief valve 81a, a second traveling relief pressure of the second relief valve 81b, a third traveling relief pressure of the third relief valve 81c, and a fourth traveling relief pressure of the fourth relief valve 81d, and to judge whether to perform the automatic deceleration by using the deceleration threshold.

According to this configuration, the traveling relief pressures of the relief valves of the traveling pump system (that is, the first traveling relief pressure of the first relief valve 81a, the second traveling relief pressure of the second relief valve 81b, the third traveling relief pressure of the third relief valve 81c, and the fourth traveling relief pressure of the fourth relief valve 81d) is used to acquire the deceleration threshold. Accordingly, even when there is a variation in the traveling relief pressures of the relief valves, the deceleration threshold corresponding to the variation can be acquired, and thus the automatic deceleration can be performed smoothly.

The working machine 1 is provided with the setting switch 73 configured to switch an operation mode between the acquisition mode for acquiring the first traveling relief pressure, the second traveling relief pressure, the third traveling relief pressure, and the fourth traveling relief pressure and the traveling mode for allowing the automatic deceleration. The controller 60 is configured or programmed so that, when the operation mode is set in the acquiring mode, a rotation speed of the prime mover is set to a predetermined rotation speed, and the first traveling relief pressure, the second traveling relief pressure, the third traveling relief pressure, and the fourth traveling relief pressure are acquired during rotation of the prime mover at the predetermined rotation speed at the predetermined speed, and so that, when the operation mode is set in the traveling mode, the deceleration threshold is determined based on the first traveling relief pressure, the second traveling relief pressure, the third traveling relief pressure, and the fourth traveling relief pressure that have been acquired in the acquisition mode.

According to this configuration, in the acquisition mode, the traveling relief pressures (that is, the first traveling relief pressure, the second traveling relief pressure, the third traveling relief pressure, and the fourth traveling relief pressure) of the relief valve of the traveling pump system can be easily acquired, and then the deceleration threshold can be easily determined based on the acquired traveling relief pressures. For example, the travel relief pressures of the relief valves installed in the working machine 1 can be acquired by setting the acquisition mode in maintenance or the like. Even when there are variations in performance of the relief valves in the individual working machines 1, the effect on the automatic deceleration can be reduced.

The controller 60 is configured or programmed to determine the deceleration threshold based on the correction coefficient, the first traveling relief pressure, the second traveling relief pressure, the third traveling relief pressure, and the fourth traveling relief pressure. According to this configuration, the deceleration threshold can be easily determined with use of the values directly measured in the relief valves of the traveling pump system (that is, the first traveling relief pressure, the second traveling relief pressure, the third traveling relief pressure, and the fourth traveling relief pressure).

The controller 60 is configured or programmed to change the correction coefficient according to variation in a rotation speed of the prime mover. According to this configuration, automatic deceleration can be performed according to a rotation speed of the prime mover, that is, a load on the prime mover.

The controller 60 is configured or programmed to increase the correction coefficient according to increase of a rotation speed of the prime mover, and to reduce the correction coefficient according to reduction of the rotation speed of the prime mover. According to this configuration, the deceleration threshold can be easily changed based on a correction coefficient corresponding to the rotation speed of the prime mover.

The controller 60 decreases the correction coefficient according to increase of a rotation speed of the prime mover, and increases the correction coefficient according to reduction of the rotation speed of the prime mover. According to this configuration, the deceleration threshold can be easily changed based on a correction coefficient corresponding to the rotation speed of the prime mover.

The working machine 1 includes the first pressure detector 80a provided on a passage of the first circulation fluid line 57h connecting the left traveling pump 53L to the first port P11 of the left traveling motor 36L and configured to detect a first traveling pressure that is a pressure of the operation fluid flowing in the passage of the first circulation fluid line 57h connected to the first port P11 of the left traveling motor 36L when the left traveling motor 36L rotates, the second pressure 80b detector provided on another passage of the first circulation fluid line 57h connecting the left traveling pump 53L to the second port P12 of the left traveling motor 36L and configured to detect a second traveling pressure that is a pressure of the operation fluid flowing in the passage of the first circulation fluid line 57h connected to the second port P12 of the left traveling motor 36L when the left traveling motor 36L rotates, the third pressure detector 80c provided on a passage of the second circulation fluid line 57i connecting the left traveling pump 53L to the third port P13 of the right traveling motor 36R and configured to detect a third traveling pressure that is a pressure of the operation fluid flowing in the passage of the second circulation fluid line 57i connected to the third port P13 of the right traveling motor 36R when the right traveling motor 36R rotates, the fourth pressure detector 80d provided on another passage of the second circulation fluid line 57i connecting the right traveling pump 53R to the fourth port P14 of the right traveling motor 36R and configured to detect a fourth traveling pressure that is a pressure of the operation fluid flowing in the passage of the second circulation fluid line 57i connected to the fourth port P14 of the right traveling motor 36R when the right traveling motor 36R rotates. When the left and right traveling motors 36L and 36R are each set in the second speed stage, the controller 60 is configured or programmed to judge whether to perform the automatic deceleration based on any one of the first traveling pressure, the second traveling pressure, the third traveling pressure, and the fourth traveling pressure and on the determined deceleration threshold.

According to this configuration, automatic deceleration can be easily performed based on the traveling pressures (that is, the first traveling pressure, the second traveling pressure, the third traveling pressure, and the fourth traveling pressure) and the deceleration threshold.

As described above, since the second speed stage need only be higher than the first speed stage, a number of gear steps in the working machine is not limited to two, and multiple gear steps (multiple steps) may be adopted to the working machine.

In the above-described embodiment, the left traveling motor 36L and the right traveling motor 36R are configured to simultaneously switch to the first speed stage or the second speed stage, and the automatic deceleration is also performed simultaneously on the left traveling motor 36L and the right traveling motor 36R; however, the automatic deceleration may be performed in a state where at least one of the left traveling motor 36L and the right traveling motor 36R is switched to the first speed stage and the other of the left traveling motor 36L and the right traveling motor 36R is at the second speed stage.

The traveling motors (that is, the left traveling motor 36L and the right traveling motor 36R) may be axial piston motors or radial piston motors. Regardless of whether the traveling motor is an axial piston motor or a radial piston motor, the traveling motor can switch to the first speed stage by increasing the motor capacity, and can switch to the second speed stage by decreasing the motor capacity.

Third Embodiment

A third embodiment of the present invention will be described with reference to the drawings. Components similar to those described in the first embodiment are given the same reference numerals and detailed descriptions thereof will be omitted.

A hydraulic system for the working device and the working device having this hydraulic system according to this embodiment have the same configuration as that described based on FIGS. 1 and 11 in the first embodiment.

With reference to FIG. 1, the measurement device 69 is connected to the controller 60 according to the present embodiment. The measurement device 69 is a sensor configured to detect the respective pressures of the first relief valve 81a, the second relief valve 81b, the third relief valve 81c, and the fourth relief valve 81d. The measurement device 69 is capable of measuring the first traveling relief pressure w1 corresponding to the first relief valve 81a, the second traveling relief pressure w2 corresponding to the second relief valve 81b, the third traveling relief pressure w3 corresponding to the third relief valve 81c, and the fourth traveling relief pressure w4 corresponding to the fourth relief valve 81d. The traveling relief pressure is a pressure at which the relief valves start to be operated, or at which the relief valves start to be operated and then become stabilized.

The controller 60 performs automatic deceleration based on pressures in the circulation fluid lines 57h and 57i. A plurality of pressure detectors 80 are connected to the circulation fluid lines 57h and 57i. The plurality of pressure detectors 80 includes the first pressure detector 80a, the second pressure detector 80b, the third pressure detector 80c, and the fourth pressure detector 80d. The first pressure detector 80a is provided in the circulation fluid line 57h near the first port P11 of the left traveling motor 36L, and detects, as the first traveling pressure LF(t), a pressure near the first port P11. The second pressure detector 80b is provided in the circulation fluid line 57h near the second port P12 of the left traveling motor 36L, and detects, as the second traveling pressure LB(t), a pressure near the second port P12. The third pressure detector 80c is provided in the circulation fluid line 57i near the third port P13 of the right traveling motor 36R, and detects, as the third traveling pressure RF(t), a pressure near the third port P13. The fourth pressure detector 80d is provided in the circulation fluid line 57i near the fourth port P14 of the right traveling motor 36R, and detects, as the fourth traveling pressure RB(t), a pressure near the fourth port P14.

The controller 60 calculates the effective traveling pressures (that is, the first effective traveling pressure, the second effective traveling pressure, the third effective traveling pressure, and the fourth effective traveling pressure) based on the first traveling pressure LF (t, rpm) detected by the first pressure detector 80a, the second traveling pressure LB (t, rpm) detected by the second pressure detector 80b, the third traveling pressure RF (t, rpm) detected by the third pressure detector 80c, and the fourth traveling pressure RB (t, rpm) detected by the fourth pressure detector 80d. The controller 60 controls the working machine 1 based on the calculated first effective traveling pressure, second effective traveling pressure, third effective traveling pressure, and fourth effective traveling pressure.

Specifically, as shown in Expression 10, the control device 60 calculates an effective traveling pressure b (t, rpm) acquired by subtracting the second traveling pressure LB (t, rpm) from the first traveling pressure LF (t, rpm), an effective traveling pressure d (t, rpm) acquired by subtracting the first traveling pressure LF (t, rpm) from the second traveling pressure LB (t, rpm), an effective traveling pressure a (t, rpm) acquired by subtracting the fourth traveling pressure RB (t, rpm) from the third traveling pressure RF (t, rpm), and an effective traveling pressure c (t, rpm) acquired by subtracting the third traveling pressure RF (t, rpm) from the fourth traveling pressure RB (t, rpm).

The sign "a (t, rpm)" represents the effective traveling pressure in normal rotation of the right traveling motor 36R, the sign "b (t, rpm)" represents the effective traveling pressure in normal rotation of the left traveling motor 36L, the sign "c (t, rpm)" represents the effective traveling pressure in reverse rotation of the right traveling motor 36R, and the sign "d (t, rpm)" represents the effective traveling pressure in reverse rotation of the left traveling motor 36L. In other words, the effective traveling pressure b (t, rpm) is the first effective traveling pressure, the effective traveling pressure d (t, rpm) is the second effective traveling pressure, the effective traveling pressure a (t, rpm) is the third effective traveling pressure, and the effective traveling pressure c (t, rpm) is the fourth effective traveling pressure.

$$\begin{pmatrix} a_{(t,rpm)} \\ b_{(t,rpm)} \\ c_{(t,rpm)} \\ d_{(t,rpm)} \end{pmatrix} = \begin{pmatrix} RF_{(t,rpm)} - RB_{(t,rpm)} \\ LF_{(t,rpm)} - LB_{(t,rpm)} \\ RB_{(t,rpm)} - RF_{(t,rpm)} \\ LB_{(t,rpm)} - LF_{(t,rpm)} \end{pmatrix} \quad \text{(Expression 10)}$$

When the controller 60 is set to the acquisition mode through a predetermined operation, the controller 60 first acquires the first traveling relief pressure w1, the second traveling relief pressure w2, the third traveling relief pressure w3, and the fourth traveling relief pressure w4 at a predetermined rotation speed of the prime mover. That is, the controller 60 (that is, the automatic decelerator 61) acquires the traveling relief pressures (that is, first traveling relief pressure w1, the second traveling relief pressure w2, the third traveling relief pressure w3, and the fourth traveling relief pressure w4) that are determined in correspondence with a prime mover rotation speed. Then, the controller 60 (that is, the automatic decelerator 61) performs a turn judgment based on the traveling relief pressures determined in correspondence with a prime mover rotation speed. The traveling relief pressure is a pressure of operation fluid at which the first relief valve 81*a*, the second relief valve 81*b*, the third relief valve 81*c*, and the fourth relief valve 81*d* start to be operated, or at which the first relief valve 81*a*, the second relief valve 81*b*, the third relief valve 81*c*, and the fourth relief valve 81*d* start to be operated and then become stabilized.

As shown in Expression 11, the controller 60 acquires a first effective relief pressure u1 (rpm) acquired by subtracting, from the first traveling relief pressure w1, the second traveling pressure acquired when the first traveling relief pressure w1 is measured, a second effective relief pressure u2 (rpm) acquired by subtracting, from the second traveling relief pressure w2, the first traveling pressure acquired when the second traveling relief pressure w2 is measured, a third effective relief pressure u3 (rpm) acquired by subtracting, from the third traveling relief pressure w3, the fourth traveling pressure acquired when the third traveling relief pressure w3 is measured, and a fourth effective relief pressure u4 (rpm) acquired by subtracting, from the fourth traveling relief pressure w4, the third traveling pressure acquired when the fourth traveling relief pressure w4 is measured.

$$\begin{pmatrix} u3(\text{rpm}) \\ u1(\text{rpm}) \\ u4(\text{rpm}) \\ u2(\text{rpm}) \end{pmatrix} = \begin{pmatrix} w3(\text{rpm}) - \text{Fourth traveling pressure at } w3 \text{ measurement} \\ w1(\text{rpm}) - \text{Second traveling pressure at } w1 \text{ measurement} \\ w4(\text{rpm}) - \text{Third traveling pressure at } w4 \text{ measurement} \\ w2(\text{rpm}) - \text{First traveling pressure at } w2 \text{ measurement} \end{pmatrix} \quad \text{(Expression 11)}$$

The controller 60 also acquires a turn judgment value TP (rpm) based on the first effective relief pressure u1 (rpm), the second effective relief pressure u2 (rpm), the third effective relief pressure u3 (rpm), and the fourth effective relief pressure u4 (rpm), the turn judgment value TP (rpm) being to be used to judge whether the working machine 1 is turning or not, as shown in Expression 12. The sign η10 is a correction coefficient.

The controller 60 subtracts the first effective relief pressure u1 (rpm) from the third effective relief pressure u3 (rpm), subtracts the third effective relief pressure u3 (rpm) from the first effective relief pressure u1 (rpm), subtracts the second effective relief pressure u2 (rpm) from the fourth effective relief pressure u4 (rpm), and subtracts the fourth effective relief pressure u4 (rpm) from the second relief pressure u2 (rpm), thereby quantifying the balance in normal rotations of the left traveling motor 36L and the right traveling motor 36R.

$$TP(\text{rpm}) = \begin{pmatrix} u3(\text{rpm}) - u1(\text{rpm}) \\ u1(\text{rpm}) - u3(\text{rpm}) \\ u4(\text{rpm}) - u2(\text{rpm}) \\ u2(\text{rpm}) - u4(\text{rpm}) \end{pmatrix} \times \eta_{10} \text{ rpm} \quad \text{(Expression 12)}$$

Alternatively, the controller 60 may acquire the turn judgment value TP (rpm) based on a reference pressure β1 (rpm), the effective relief pressures, and the correction coefficient 1112, as shown in Expression 4.

$$TP(\text{rpm}) = \beta 1_{(\text{rpm})} \pm \begin{pmatrix} u3(\text{rpm}) - u1(\text{rpm}) \\ u1(\text{rpm}) - u3(\text{rpm}) \\ u4(\text{rpm}) - u2(\text{rpm}) \\ u2(\text{rpm}) - u4(\text{rpm}) \end{pmatrix} \times \eta_{12} \quad \text{(Expression 13)}$$

The controller 60 may use a turn result on whether the working machine 1 is turning based on the turn judgment value TP(rpm) in determination of the deceleration threshold for automatic deceleration, may display the turn result on a display device, or may inform, by a buzzer, lamp, or the like, that the working machine 1 is turning.

For example, when the value acquired by subtracting the third effective relief pressure u3 (rpm) from the first effective relief pressure u1 (rpm) is high, the working machine 1 (machine body 2) tends to produce a higher pressure in the normal rotation of the left traveling motor 36L (that is, an individual difference of the working machine 1). At this time, when the turn judgment value TP(rpm) acquired in Expression 14 is used, the controller 60 can determines that the working machine 1 is turning when any one of a value acquired by subtracting the effective traveling pressure b (t, rpm) from the effective traveling pressure a (t, rpm), a value acquired by subtracting the effective traveling pressure a (t, rpm) from the effective traveling pressure b (t, rpm), a value acquired by subtracting the effective traveling pressure c (t, rpm) from the effective traveling pressure d (t, rpm), and a the value acquired by subtracting the effective traveling pressure c (t, rpm) from the effective traveling pressure d (t, rpm) satisfies the Expression 14 using the above-mentioned turn judgment value TP(rpm). According to a mechanism configured as described above, the turn of the working machine 1 can be judged accurately even when there is a tendency (that is, an individual difference) for a pressure in normal rotation of the left traveling motor 36L to be higher.

$$\begin{pmatrix} a(t, \text{rpm}) - b(t, \text{rpm}) \\ b(t, \text{rpm}) - a(t, \text{rpm}) \\ c(t, \text{rpm}) - d(t, \text{rpm}) \\ d(t, \text{rpm}) - c(t, \text{rpm}) \end{pmatrix} \geq TP(\text{rpm}) \quad \text{(Expression 14)}$$

The controller 60 may use a turn result on whether the working machine 1 is turning based on the turn judgment value TP (rpm) in determination of the deceleration threshold for automatic deceleration, may display the turn result on a display device, or may inform, by a buzzer, lamp, or the like, that the working machine 1 is turning.

The controller 60 determines the deceleration threshold ST (rpm) for automatic deceleration based on the first effective relief pressure u1 (rpm), the second effective relief pressure u2 (rpm), the third effective relief pressure u3 (rpm), the fourth effective relief pressure u4 (rpm), and a correction coefficient η13, as shown in Expression 15.

$$ST(\text{rpm}) = \begin{pmatrix} u3(\text{rpm}) \\ u1(\text{rpm}) \\ u4(\text{rpm}) \\ u2(\text{rpm}) \end{pmatrix} \times \eta_{13} \quad \text{(Expression 15)}$$

Alternatively, the controller 60 may determine, with a correction coefficient η11, the deceleration threshold ST (rpm) for automatic deceleration based on a reference pressure (32 (rpm), the first effective relief pressure u1 (rpm), the second effective relief pressure u2 (rpm), the third effective relief pressure u3 (rpm), and the fourth effective relief pressure u4 (rpm), as shown in Expression 16.

$$ST(\text{rpm}) = \beta2_{(\text{rpm})} \pm \begin{pmatrix} u3(\text{rpm}) \\ u1(\text{rpm}) \\ u4(\text{rpm}) \\ u2(\text{rpm}) \end{pmatrix} \times \eta_{11} \qquad \text{(Expression 16)}$$

In this case, judgment on whether or not to perform automatic deceleration is made based on the effective traveling pressures (that is, the first effective traveling pressure, the second effective traveling pressure, the third effective traveling pressure, and the fourth effective traveling pressure).

Specifically, the controller 60 (that is, the automatic decelerator 61) performs automatic deceleration when Expression 17 is satisfied.

$$\begin{pmatrix} a(t, \text{rpm}) \\ b(t, \text{rpm}) \\ c(t, \text{rpm}) \\ d(t, \text{rpm}) \end{pmatrix} \geq ST(\text{rpm}) \qquad \text{(Expression 17)}$$

Accordingly, using the deceleration threshold ST (rpm) acquired in Expression 15 or Expression 16, automatic deceleration can be performed according to balance in the working machine 1 (that is, the machine body 2) between traveling of the left traveling device 5L (that is, rotation of the left traveling motor 36L) and traveling of the right traveling device 5R (that is, rotation of the right traveling motor 36R).

The work machine 1 includes the machine body 2, the prime mover 32 provided on the machine body 2, the left traveling device 5L provided on a left portion of the machine body 2, the right traveling device 5R provided on a right portion of the machine body 2, the left traveling motor 36L configured to output a power transmitted to the left traveling device 5L and to have a rotation speed set at a speed stage between a first speed stage and a second speed stage higher than the first speed stage, the right traveling motor 36R configured to output a power transmitted to the right traveling device 5R and to have a rotation speed set at a speed stage shiftable between a first speed stage and a second speed stage higher than the first speed stage, the left traveling pump 53L having the first port 82a to deliver operation fluid for normal rotation of the left traveling motor 36L and the second port 82b to deliver operation fluid for reverse rotation of the left traveling motor 36L, the right traveling pump 36R having the third port 82c to deliver operation fluid for normal rotation of the right traveling motor 36R and the fourth port 82d to deliver operation fluid for reverse rotation of the right traveling motor 36R, the first circulation fluid line 57h including a passage extended from the first port 82a of the left traveling pump 53L and another passage extended from the second port 82b of the left traveling pump 53L and connecting the passages extended from the first and second ports 82a and 82b of the left traveling pump 53L to the left traveling motor 36L, the second circulation fluid line 57i including a passage extended from the third port 82c of the right traveling pump 53R and another passage extended from the fourth port 82d of the right traveling pump 53R and connecting the passages extended from the third and fourth ports 82c and 82d of the right traveling pump 53R to the right traveling motor 36R, the first relief valve 81a connected to the passage of the first circulation fluid line 57h extended from the first port 82a, the second relief valve 81b connected to the passage of the first circulation fluid line 57h extended from the second port 82b, the third relief valve 81c connected to the passage of the second circulation fluid line 57i extended from the third port 82c, the fourth relief valve 81d connected to the passage of the second circulation fluid line 57i extended from the fourth port 82d, and the controller 60 configured or programmed to perform a control, and to judge whether to perform the control based on any one of a first effective relief pressure corresponding to the first relief valve 81a, the second effective relief pressure corresponding to the second relief valve 81b, the third effective relief pressure corresponding to the third relief valve 81c, and the fourth effective relief pressure corresponding to the fourth relief valve 81d.

According to this configuration, since the control is performed based on the first effective relief pressure, the second effective relief pressure, the third effective relief pressure, and the fourth effective relief pressure. Accordingly, in the respective cases where the left traveling motor 36L and the right traveling motor 36R rotate in a normal direction and a reverse direction, a traveling pressure acting on a direction of the reverse rotation can be canceled in the circulation fluid lines (that is, the first circulation fluid line 57h and the second circulation fluid line 57i) in the normal rotation, and a traveling pressure acting on a direction of the normal rotation can be canceled in the reverse rotation, thereby allowing an operator to make the working machine 1 travel or the like while easily knowing a traveling state of the working machine 1. That is, it is possible to operate the working machine 1 while knowing pressures of operation fluid that reflects a state of the working device more precisely.

The controller 60 is configured to perform the automatic deceleration control to automatically reduce the rotation speeds of the left and right traveling motors 36L and 36R by shifting the speed stage of each of the left and right traveling motors 36L and 36R from the second speed stage to the first speed stage. The controller 60 is configured or programmed to determine the deceleration threshold based on at least one of the first effective relief pressure, the second effective relief pressure, the third effective relief pressure, and the fourth effective relief pressure during rotation of the left and right traveling motors each set at the second speed stage. And the controller 60 is configured or programmed to judge whether to perform the automatic deceleration control by using the determined deceleration threshold. According to this configuration, the deceleration threshold for judging whether or not to perform automatic deceleration can be easily determined based on the accurate effective relief pressures, and automatic deceleration can be performed according to a traveling state of the working machine 1.

The controller 60 is configured or programmed to determine the turn judgment value based on the respective first effective relief pressure, second effective relief pressure, third effective relief pressure, and fourth effective relief pressure. And the controller 60 is configured or programmed to judge whether the machine body 2 is turning or not by using the determined turn judgment value. According to this configuration, the turn judgment value for judging whether or not a turn is being made can be easily determined based on the accurate effective relief pressures, and accordingly a traveling state of the working machine 1 can be known more accurately.

As described above, since the second speed stage need only be higher than the first speed stage, a number of gear steps in the working machine is not limited to two, and multiple gear steps (multiple steps) may be adopted to the working machine.

In the above-described embodiment, the left traveling motor 36L and the right traveling motor 36R are configured to simultaneously switch to the first speed stage or the second speed stage, and the automatic deceleration is also performed simultaneously on the left traveling motor 36L and the right traveling motor 36R; however, the automatic deceleration may be performed in a state where at least one of the left traveling motor 36L and the right traveling motor 36R is switched to the first speed stage and the other of the left traveling motor 36L and the right traveling motor 36R is at the second speed stage.

The traveling motors (that is, the left traveling motor 36L and the right traveling motor 36R) may be axial piston motors or radial piston motors. Regardless of whether the traveling motor is an axial piston motor or a radial piston motor, the traveling motor can switch to the first speed stage by increasing the motor capacity, and can switch to the second speed stage by decreasing the motor capacity.

In the above-mentioned embodiment, the turn judgment value TP (rpm) and the deceleration threshold ST (rpm) are calculated using the effective relief pressures. However, instead of the calculation using the effective relief pressures, the turn judgment value TP (rpm) and the deceleration threshold ST (rpm) corresponding to variables such as a prime mover rotation speed may be determined in advance, for example. A case where a variable is used in place of the effective relief pressures will be described below with reference to the drawings.

Figure 6:
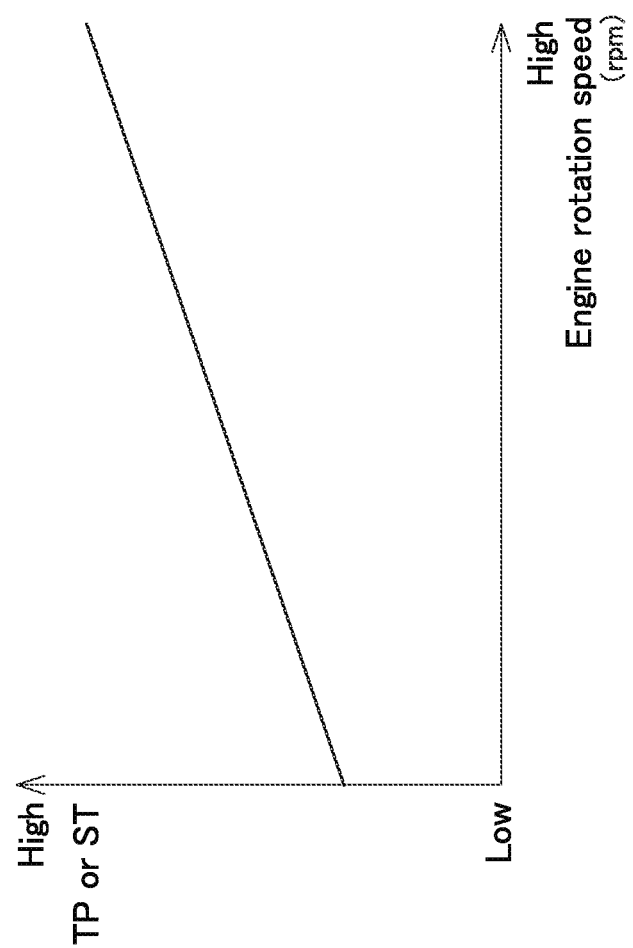
FIG. 6 is a view showing a graph representing a relationship between the prime mover rotation speed and a turn judgment value or deceleration threshold according to the embodiment.

With reference to FIG. 6, a case where a prime mover rotation speed is used instead of the effective relief pressures will be explained. FIG. 6 is a graph qualitatively showing a relationship between a prime mover rotation speed and the turn judgment value TP (rpm) or the deceleration threshold ST (rpm).

The turn judgment value TP (rpm) and the deceleration threshold ST (rpm) according to the above-mentioned embodiment are acquired by using the effective relief pressures at a certain prime mover rotation speed (rpm). However, the turn judgment value TP (rpm) and the deceleration threshold ST (rpm) corresponding to the prime mover rotation speed (rpm) may be determined in advance for each machine body of the working device and stored in the controller 60. The turn judgment value TP (rpm) and the deceleration threshold value ST (rpm) become larger as a prime mover rotation speed is increased, as shown in FIG. 6. However, the turn judgment value TP (rpm) and the deceleration threshold ST (rpm) do not necessarily have to be in proportional relationship shown in FIG. 6 with the prime mover rotation speed. The turn judgment value TP (rpm) and the deceleration threshold ST (rpm) may be determined for each individual working machine 1 in correspondence with a prime mover rotation speed.

Figure 7:
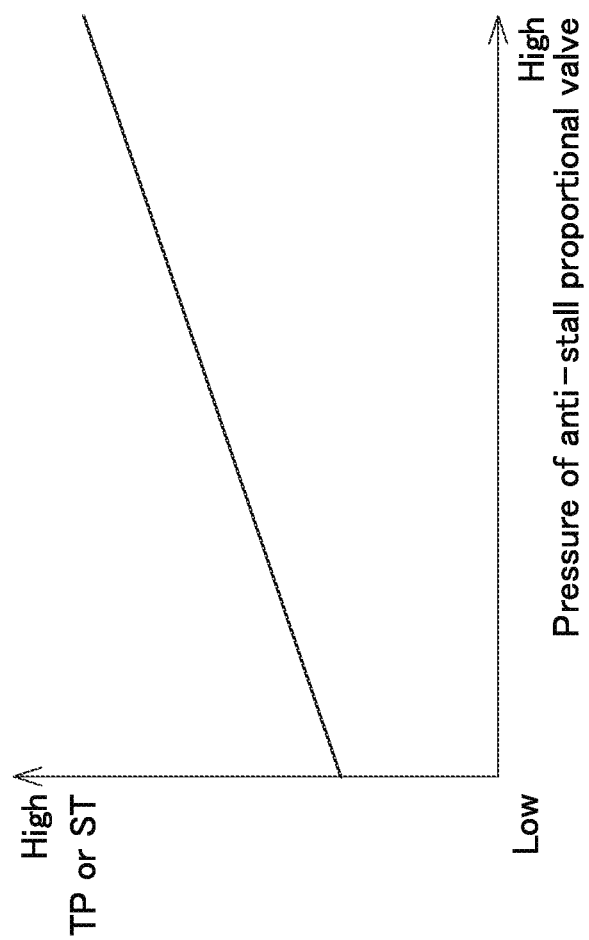
FIG. 7 is a view showing a graph representing a relationship between a pressure of an anti-stall proportional valve and the turn judgment value or deceleration threshold according to the embodiment.

Referring to FIG. 7, a case where a pressure (or an opening degree) of the anti-stall proportional valve 90 is used instead of the effective relief pressures will be described. FIG. 7 is a graph qualitatively showing a relationship between a pressure (or an opening degree) of the anti-stall proportional valve 90 and the turn judgment value TP (rpm) or the deceleration threshold ST (rpm).

The anti-stall proportional valve 90 is an actuation valve, such as an electromagnetic proportional valve, provided in the output fluid line 40 in the hydraulic circuit of FIG. 1. The anti-stall proportional valve 90 is, for example, a valve that prevents stalling of the prime mover 32, that is, engine stall by changing the pilot pressure through changing of the opening degree in accordance with a dropping amount (a lowering amount) of a rotation speed of the prime mover 32.

In the case where a pressure (or an opening degree) of the anti-stall proportional valve 90 is used in place of the effective relief pressures, the turn judgment value TP (rpm) and the deceleration threshold ST (rpm) corresponding to the pressure (or the opening degree) of the anti-stall proportional valve 90 may be determined in advance for each machine body of the working machine and stored in the controller 60. The turn judgment value TP (rpm) and the deceleration threshold value ST (rpm) become larger as a pressure of the anti-stall proportional valve 90 becomes higher (or an opening degree becomes larger), as shown in FIG. 7. However, the turn judgment value TP (rpm) and the deceleration threshold ST (rpm) do not necessarily have to be in a proportional relationship shown in FIG. 7 with a pressure (or an opening degree) of the anti-stall proportional valve 90. The turn judgment value TP (rpm) and the deceleration threshold ST (rpm) may be determined for each individual working machine 1 in correspondence with a pressure (or an opening degree) of the anti-stall proportional valve 90.

Figure 8:
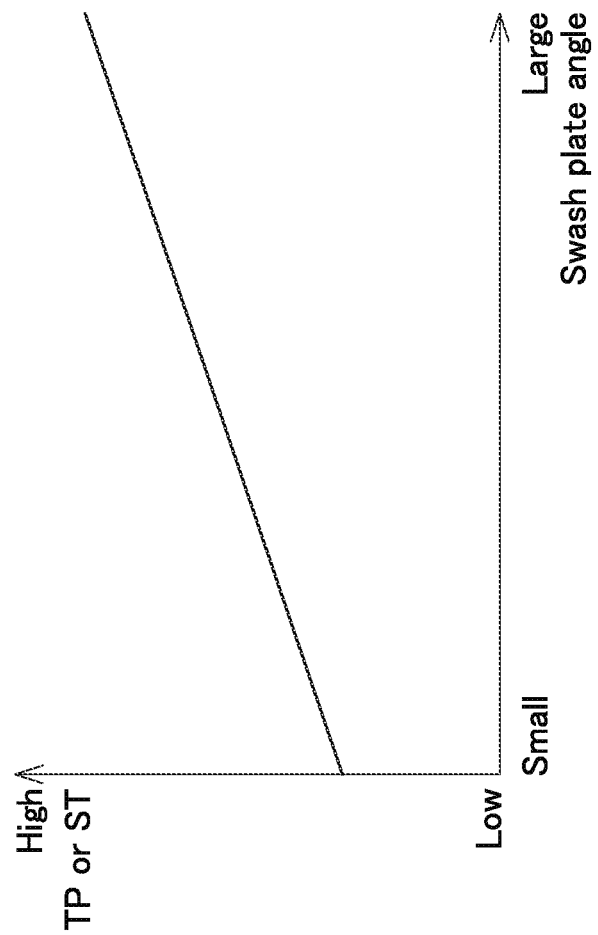
FIG. 8 is a view showing a graph representing a relationship between a swash plate angle of a traveling pump and the turn judgment value or deceleration threshold according to the embodiment.

Referring to FIG. 8, a case where angles of swash plates of the traveling pumps 53L and 53R (referred to as swash plate angles) are used instead of the effective relief pressures will be described. FIG. 8 is a graph qualitatively showing a relationship between swash plate angles of the traveling pumps 53L and 53R and the turn judgment value TP (rpm) or the deceleration threshold ST (rpm).

In the case where the swash plate angles of the traveling pumps 53L and 53R are used in place of the effective relief pressures, the turn judgment value TP (rpm) and the deceleration threshold ST (rpm) corresponding to the swash plate angles may be determined in advance for each machine body of the working machine and stored in the controller 60. The turn judgment value TP (rpm) and the deceleration threshold value ST (rpm) increase as the swash plate angles of the traveling pumps 53L and 53R are increased, as shown in FIG. 8. However, the turn judgment value TP (rpm) and the deceleration threshold ST (rpm) do not necessarily have to be in a proportional relationship shown in FIG. 8 with the swash plate angles of the traveling pumps 53L and 53R. The turn judgment value TP (rpm) and the deceleration threshold ST (rpm) may be determined for each individual working machine 1, corresponding to the swash plate angles of the traveling pumps 53L and 53R.

Figure 9:
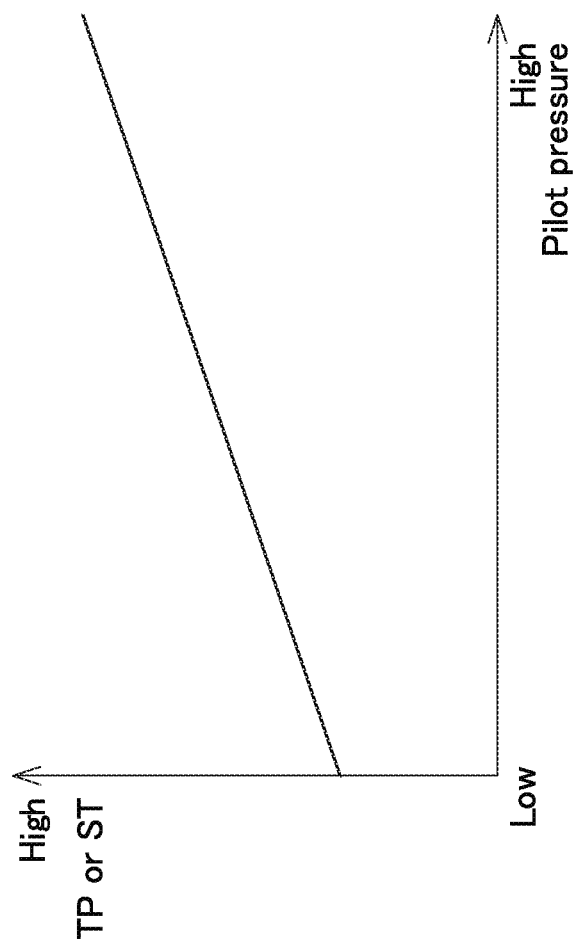
FIG. 9 is a view showing a graph qualitatively representing a relationship between a pilot pressure of a traveling fluid line and the turn judgment value or deceleration threshold according to the embodiment.

Referring to FIG. 9, a case where the respective pilot pressures of the first traveling fluid line 45a, the second traveling fluid line 45b, the third traveling fluid line 45c, and the fourth traveling fluid line 45d are used instead of the effective relief pressure will be described. FIG. 9 is a graph qualitatively showing a relationship between a pilot pressure of the first traveling fluid line 45a, the second traveling fluid line 45b, the third traveling fluid line 45c, or the fourth traveling fluid line 45d and the turn judgment value TP (rpm) or the deceleration threshold ST (rpm).

In the case where the respective pilot pressures of the first traveling fluid line 45a, the second traveling fluid line 45b, the third traveling fluid line 45c, and the fourth traveling fluid line 45d are used instead of the effective relief pressures, the turn judgment value TP (rpm) and the deceleration threshold ST (rpm) corresponding to these pilot pressures may be determined in advance for each machine body of the working machine and stored in the controller 60. Specifically, the controller 60 may detect the highest pilot pressure from the pilot pressures of the first traveling fluid line 45a, the second traveling fluid line 45*b*, the third traveling fluid line 45*c*, and the fourth traveling fluid line 45*d*, and read the turn judgment value TP (rpm) and the deceleration threshold ST (rpm) corresponding to the detected pilot pressure from the preliminarily-stored turn judgment value TP (rpm) and deceleration threshold ST (rpm).

The turn judgment value TP (rpm) and the deceleration threshold ST (rpm) increase as the pilot pressures of the first traveling fluid line 45*a*, the second traveling fluid line 45*b*, the third traveling fluid line 45*c*, and the fourth traveling fluid line 45*d* are increased, as shown in FIG. 9. However, the turn judgment value TP (rpm) and the deceleration threshold ST (rpm) do not necessarily have to be in a proportional relationship shown in FIG. 9 with the pilot pressures. The turn judgment value TP (rpm) and the deceleration threshold ST (rpm) should be determined for each individual working machine 1, corresponding to the pilot pressures of the traveling fluid lines described above.

Figure 10:
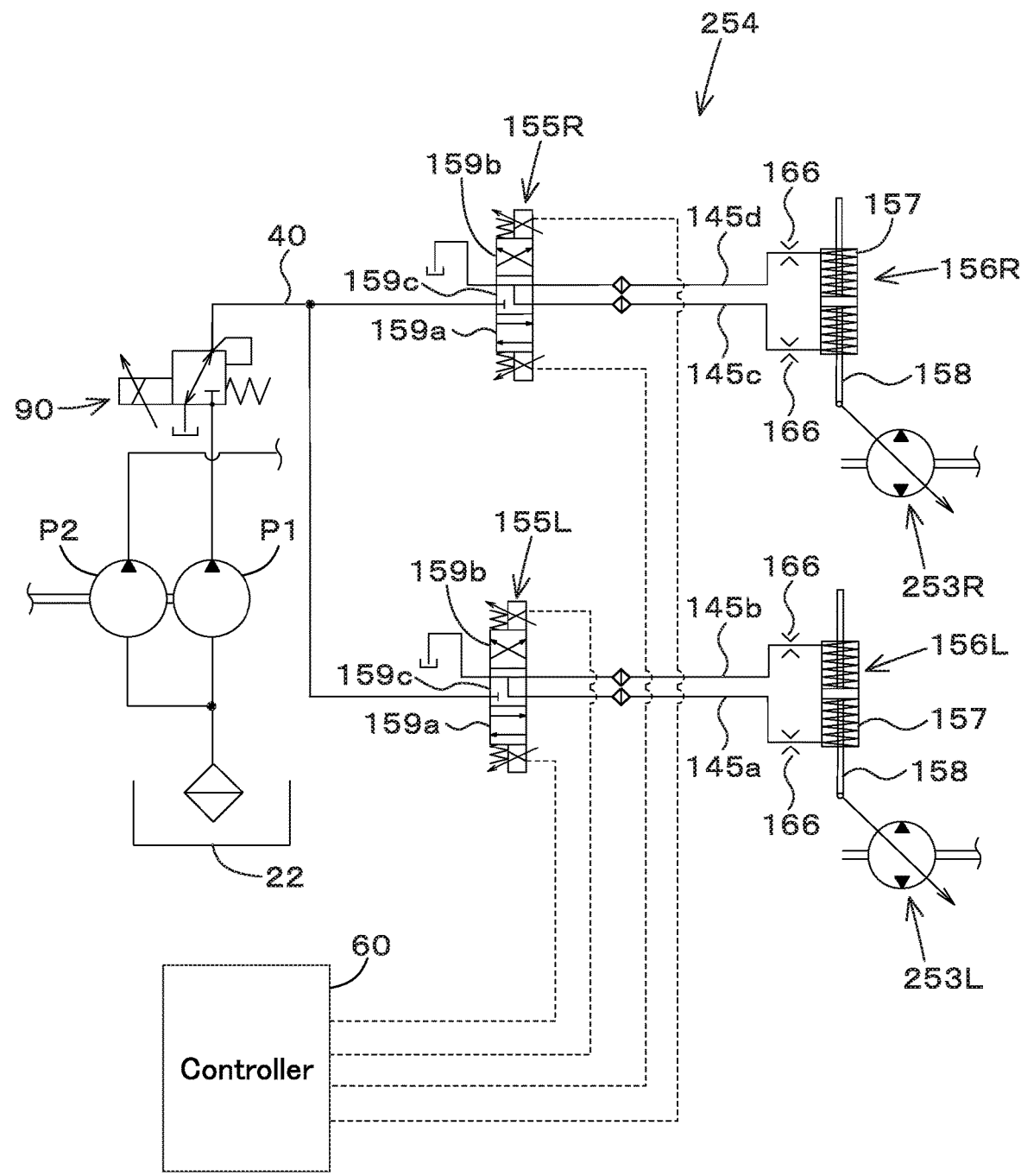
FIG. 10 is a view showing an example of a traveling device constituted of the hydraulic circuit according to the embodiment.

Here, the configuration using the pilot pressures of the traveling fluid lines may be applied to the hydraulic circuit shown in FIG. 10. FIG. 10 shows an example of a traveling device constituted of a hydraulic circuit. The traveling operation device 254 shown in FIG. 10 has operation valves 155L and 155R and hydraulic regulators 156L and 156R. Each of the hydraulic regulators 156L and 156R has a supply chamber 157 to which operation fluid can be supplied and a piston rod 158 provided in the supply chamber 157. The piston rod 158 of the hydraulic pressure regulator 156L is connected to a swash plate of a first traveling pump 253L. The piston rod 158 of a hydraulic pressure regulator 156R is connected to a swash plate of a second traveling pump 253R. The angles of swash plates of the traveling pumps 253L and 253R are changed through operations (that is, straight-line movements) of the piston rods 158 of the hydraulic regulator 156L and 156R.

The operation valve 155L is a solenoid proportional valve configured to operate the hydraulic regulator 156L and is switchable between a first position 159*a*, a second position 159*b*, and a neutral position 159*c*. A position of the operation valve 155L is changed by moving a spool of the operation valve 155L based on a control signal output from the controller 60. A first port of the operation valve 155L and the supply chamber 157 of the hydraulic regulator 156L are connected by the first traveling fluid line 145*a*. The second port of the operation valve 155L and the supply chamber 157 of the hydraulic regulator 156L are connected by the second traveling fluid line 145*b*.

The operation valve 155R is a solenoid proportional valve configured to operate the hydraulic regulator 156R and is switchable between the first position 159*a*, the second position 159*b*, and the neutral position 159*c*. A position of the operation valve 155R is changed by moving a spool of the operation valve 155R based on a control signal output from the controller 60. A first port of the operation valve 155R and the supply chamber 157 of the hydraulic regulator 156R are connected by the third traveling fluid line 145*c*. The second port of the operation valve 155R and the supply chamber 157 of the hydraulic regulator 156R are connected by the fourth traveling fluid line 145*d*.

The controller 60 outputs control signals to the operation valve 155L and the operation valve 155R to switch the operation valve 155L and the operation valve 155R to the first position 159*a*. In this manner, the swash plates of the first traveling pump 253L and the second traveling pump 253R are swung in a direction of normal rotation, and the first traveling pump 253L and the second traveling pump 253R become capable of normally rotating.

The controller 60 outputs control signals to the operation valve 155L and the operation valve 155R to switch the operation valve 155L and the operation valve 155R to the second position 159*b*. In this manner, the swash plates of the first traveling pump 253L and the second traveling pump 253R are swung in a direction of reverse rotation, and the first traveling pump 253L and the second traveling pump 253R become capable of reversely rotating.

The controller 60 outputs control signals to the operation valve 155L and the operation valve 155R to switch the operation valve 155L to the first position 159*a* and to switch the operation valve 155R to the second position 159*b*. In this manner, the swash plate of the first traveling pump 253L is swung in the direction of normal rotation, thereby enabling the first traveling pump 253L to normally rotate, and the swash plate of the second traveling pump 253R is swung in the direction of reverse rotation, thereby enabling the second traveling pump 253R to reversely rotate.

Further, the controller 60 outputs control signals to the operation valve 155L and the operation valve 155R to switch the operation valve 155L to the second position 159*b* and to switch the operation valve 155R to the first position 159*a*. In this manner, the swash plate of the first traveling pump 253L is swung in the direction of reverse rotation, thereby enabling the first traveling pump 253L to reversely rotate, and the swash plate of the second traveling pump 253R is swung in the direction of normal rotation, thereby enabling the second traveling pump 253R to normally rotate.

When the first traveling fluid line 145*a*, the second traveling fluid line 145*b*, the third traveling fluid line 145*c*, and the fourth traveling fluid line 145*d* in the hydraulic circuit shown in FIG. 10 correspond to the first traveling fluid line 45*a*, the second traveling fluid line 45*b*, the third traveling fluid line 45*c*, and the fourth traveling fluid line 45*d* described with reference to FIG. 9, the turn judgment value TP (rpm) and the deceleration threshold ST (rpm) can be acquired using the method explained with reference to FIG. 9.

Specifically, the controller 60 may detect the highest pilot pressure from the respective pilot pressures of the first traveling fluid line 145*a*, the second traveling fluid line 145*b*, the third traveling fluid line 145*c*, and the fourth traveling fluid line 145*d*, and may read the turn judgment value TP (rpm) and the deceleration threshold ST (rpm) corresponding to the detected pilot pressures from the preliminarily-stored turn judgment value TP (rpm) and the deceleration threshold ST (rpm).

As described above, the turn judgment can be performed by acquiring the turn judgment value TP (rpm) and the deceleration threshold ST (rpm) even when using a prime mover rotation speed, a pressure (or an opening degree) of an anti-stall proportional valve, an angle of swash plate of a traveling pump, or a pilot pressure of a traveling fluid line instead of the effective relief pressures, and accordingly automatic deceleration can be performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   a left traveling device provided on a left portion of the machine body;

a right traveling device provided on a right portion of the machine body;
a left traveling motor configured to output a power transmitted to the left traveling device;
a right traveling motor configured to output a power transmitted to the right traveling device;
a left traveling pump to deliver operation fluid supplied to the left traveling motor, a part of the operation fluid being used to control the operation fluid delivery of the left traveling pump;
a right traveling pump to deliver operation fluid supplied to the right traveling motor, a part of the operation fluid being used to control the operation fluid delivery of the right traveling pump;
a first circulation fluid line connecting the left traveling pump to the left traveling motor, the left traveling motor having a first port and a second port to receive and discharge the operation fluid from and to the left traveling pump via the first circulation fluid line;
a second circulation fluid line connecting the right traveling pump to the right traveling motor, the right traveling motor having a third port and a fourth port to receive and discharge the operation fluid from and to the right traveling pump via the second circulation fluid line;
a first pressure detector to detect a first traveling pressure that is a pressure of the operation fluid flowing in a portion of the first circulation fluid line interposed between the left traveling pump and the first port of the left traveling motor when the left traveling motor rotates;
a second pressure detector to detect a second traveling pressure that is a pressure of the operation fluid flowing in another portion of the first circulation fluid line interposed between the left traveling pump and the second port of the left traveling motor when the left traveling motor rotates;
a third pressure detector to detect a third traveling pressure that is a pressure of the operation fluid flowing in a portion of the second circulation fluid line interposed between the right traveling pump and the third port of the right traveling motor when the right traveling motor rotates;
a fourth pressure detector to detect a fourth traveling pressure that is a pressure of the operation fluid flowing in another portion of the second circulation fluid line interposed between the right traveling pump and the fourth port of the right traveling motor when the right traveling motor rotates; and
a controller configured or programmed
to determine a first deceleration threshold corresponding to each of the first, second, third and fourth traveling pressures,
to perform automatic deceleration to reduce rotation speeds of the left and right traveling motors, and
to judge whether to perform the automatic deceleration based on the determined first deceleration threshold and the first, second, third and fourth traveling pressures.

2. The working machine according to claim 1, wherein the controller is configured or programmed to determine the first deceleration threshold corresponding to each rotation speed of a prime mover, and corresponding to each of the first, second, third and fourth traveling pressures.

3. The working machine according to claim 2, wherein the controller is configured or programmed to determine the first deceleration threshold corresponding to one rotation speed of the prime mover, and varying to correspond to each of the first, second, third and fourth traveling pressures.

4. The working machine according to claim 2, wherein the controller is configured or programmed:
to refer to the first, second, third and fourth traveling pressures during rotation of the prime mover at a predetermined rotation speed; and
to perform the automatic deceleration when any one of the referred-to first, second, third and fourth traveling pressures is equal to or higher than the first deceleration threshold.

5. The working machine according to claim 1, wherein the controller is configured or programmed:
to determine a first restoration threshold corresponding to each of the first, second, third and fourth traveling pressures;
to perform speed-restoration to restore the rotation speeds of the left and right traveling motors before performing the automatic deceleration; and
to judge whether to perform the speed-restoration based on the determined first restoration threshold and the first, second, third and fourth traveling pressures.

6. The working machine according to claim 5, wherein the controller is configured or programmed to determine the first restoration threshold corresponding to each rotation speed of a prime mover, and corresponding to each of the first, second, third and fourth traveling pressures.

7. The working machine according to claim 6, wherein the controller is configured or programmed to determine the first restoration threshold corresponding to one rotation speed of the prime mover, and varying to correspond to each of the first, second, third and fourth traveling pressures.

8. The working machine according to claim 6, wherein the controller is configured or programmed:
to refer to the first, second, third and fourth traveling pressures during rotation of the prime mover at a predetermined rotation speed; and
to perform the speed-restoration when any one of the referred-to first, second, third and fourth traveling pressures is equal to or less than the first restoration threshold.

9. A working machine comprising:
a machine body;
a left traveling device provided on a left portion of the machine body;
a right traveling device provided on a right portion of the machine body;
a left traveling motor configured to output a power transmitted to the left traveling device;
a right traveling motor configured to output a power transmitted to the right traveling device;
a left traveling pump to deliver operation fluid supplied to the left traveling motor, a part of the operation fluid being used to control the operation fluid delivery of the left traveling pump;
a right traveling pump to deliver operation fluid supplied to the right traveling motor, a part of the operation fluid being used to control the operation fluid delivery of the right traveling pump;
a first circulation fluid line connecting the left traveling pump to the left traveling motor, the left traveling motor having a first port and a second port to receive and discharge the operation fluid from and to the left traveling pump via the first circulation fluid line;

a second circulation fluid line connecting the right traveling pump to the right traveling motor, the right traveling motor having a third port and a fourth port to receive and discharge the operation fluid from and to the right traveling pump via the second circulation fluid line;

a first pressure detector to detect a first traveling pressure that is a pressure of the operation fluid flowing in a portion of the first circulation fluid line interposed between the left traveling pump and the first port of the left traveling motor when the left traveling motor rotates;

a second pressure detector to detect a second traveling pressure that is a pressure of the operation fluid flowing in another portion of the first circulation fluid line interposed between the left traveling pump and the second port of the left traveling motor when the left traveling motor rotates;

a third pressure detector to detect a third traveling pressure that is a pressure of the operation fluid flowing in a portion of the second circulation fluid line interposed between the right traveling pump and the third port of the right traveling motor when the right traveling motor rotates;

a fourth pressure detector to detect a fourth traveling pressure that is a pressure of the operation fluid flowing in another portion of the second circulation fluid line interposed between the right traveling pump and the fourth port of the right traveling motor when the right traveling motor rotates; and a controller configured or programmed
to determine a second deceleration threshold corresponding to each of a first differential pressure acquired by subtracting the second traveling pressure from the first traveling pressure, a second differential pressure acquired by subtracting the first traveling pressure from the second traveling pressure, a third differential pressure acquired by subtracting the fourth traveling pressure from the third traveling pressure, and a fourth differential pressure acquired by subtracting the third traveling pressure from the fourth traveling pressure,
to perform automatic deceleration to reduce rotation speeds of the left and right traveling motors, and
to judge whether to perform the automatic deceleration based on the determined second deceleration threshold and the first, second, third and fourth differential pressures.

10. The working machine according to claim 9, wherein the controller is configured or programmed to determine the second deceleration threshold corresponding to each rotation speed of a prime mover, and corresponding to each of the first, second, third and fourth differential pressures.

11. The working machine according to claim 10, wherein the controller is configured or programmed to determine the second deceleration threshold corresponding to one rotation speed of the prime mover, and varying to correspond to each of the first, second, third and fourth differential pressures.

12. The working machine according to claim 10, wherein the controller is configured or programmed:
to calculate the first, second, third and fourth differential pressures during rotation of the prime mover at a predetermined rotation speed; and
to perform the automatic deceleration when any one of the calculated first, second, third and fourth differential pressures is equal to or higher than the second deceleration threshold.

13. The working machine according to claim 9, wherein the controller is configured or programmed:
to determine a second restoration threshold corresponding to each of the first, second, third and fourth differential pressures,
to perform speed-restoration to restore the rotation speeds of the left and right traveling motors before performing the automatic deceleration; and
to judge whether to perform the speed-restoration based on the determined second restoration threshold and the first, second, third and fourth differential pressures.

14. The working machine according to claim 13, wherein the controller is configured or programmed to determine the second restoration threshold corresponding to each rotation speed of a prime mover, and corresponding to each of the first, second, third and fourth differential pressures.

15. The working machine according to claim 14, wherein the controller is configured or programmed to determine the second restoration threshold corresponding to one rotation speed of the prime mover, and varying to correspond to each of the first, second, third and fourth differential pressures.

16. The working machine according to claim 14, wherein the controller is configured or programmed:
to calculate the first, second, third and fourth differential pressures during rotation of the prime mover at a predetermined rotation speed, and
to perform the speed-restoration when any one of the calculated first, second, third and fourth differential pressures is equal to or less than the second restoration threshold.

17. A working machine comprising:
a machine body;
a prime mover provided on the machine body;
a left traveling device provided on a left portion of the machine body;
a right traveling device provided on a right portion of the machine body;
a left traveling motor configured to output a power transmitted to the left traveling device and to have a rotation speed set at a speed stage shiftable between a first speed stage and a second speed stage higher than the first speed stage;
a right traveling motor configured to output a power transmitted to the right traveling device and to have a rotation speed set at a speed stage shiftable between a first speed stage and a second speed stage higher than the first speed stage;
a left traveling pump having
a first port to deliver operation fluid for normal rotation of the left traveling motor, and
a second port to deliver operation fluid for reverse rotation of the left traveling motor;
a right traveling pump having
a third port to deliver operation fluid for normal rotation of the right traveling motor, and
a fourth port to deliver operation fluid for reverse rotation of the right traveling motor;
a first circulation fluid line including a passage extended from the first port of the left traveling pump and another passage extended from the second port of the left traveling pump, and connecting the passages extended from the first and second ports of the left traveling pump to the left traveling motor;
a second circulation fluid line including a passage extended from the third port of the right traveling pump and another passage extended from the fourth port of the right traveling pump, and connecting the passages extended from the third and fourth ports of the right traveling pump to the right traveling motor;
a first relief valve connected to the passage of the first circulation fluid line extended from the first port;
a second relief valve connected to the passage of the first circulation fluid line extended from the second port;
a third relief valve connected to the passage of the second circulation fluid line extended from the third port;
a fourth relief valve connected to the passage of the second circulation fluid line extended from the fourth port; and
a controller configured or programmed
to perform a control, and
to judge whether to perform the control based on any one of a first effective relief pressure corresponding to the first relief valve, a second effective relief pressure corresponding to the second relief valve, a third effective relief pressure corresponding to the third relief valve, and a fourth effective relief pressure corresponding to the fourth relief valve.

18. The working machine according to claim 17, wherein the controller is configured or programmed:
to determine a deceleration threshold based on at least one of the first effective relief pressure, the second effective relief pressure, the third effective relief pressure, and the fourth effective relief pressure during rotation of the left and right traveling motors each set at the second speed stage;
to perform an automatic deceleration control to automatically reduce the rotation speeds of the left and right traveling motors by shifting the speed stage of each of the left and right traveling motors from the second speed stage to the first speed stage; and
to judge whether to perform the automatic deceleration control by using the determined deceleration threshold.

19. The working machine according to claim 18, wherein the controller is configured or programmed:
to determine a turn judgment value based on at least one of the first effective relief pressure, the second effective relief pressure, the third effective relief pressure, and the fourth effective relief pressure; and
to judge whether the machine body is turning or not by using the determined turn judgment value.

* * * * *